United States Patent
Lee

(10) Patent No.: US 7,327,762 B2
(45) Date of Patent: Feb. 5, 2008

(54) PACKET DATA PROCESSING APPARATUS IN PACKET DATA COMMUNICATION SYSTEM

(75) Inventor: Seoung-Bok Lee, Songnam-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 944 days.

(21) Appl. No.: 10/602,729

(22) Filed: Jun. 25, 2003

(65) Prior Publication Data
US 2004/0008728 A1    Jan. 15, 2004

(30) Foreign Application Priority Data
Jun. 26, 2002    (KR) .................... 10-2002-0035985

(51) Int. Cl.
*H04J 3/24* (2006.01)
(52) U.S. Cl. ...................... 370/474; 370/338
(58) Field of Classification Search ................ 370/310, 370/338, 342, 352, 465, 466, 474
See application file for complete search history.

(56) References Cited

U.S. PATENT DOCUMENTS

| | | | |
|---|---|---|---|
| 5,978,386 A * | 11/1999 | Hamalainen et al. ....... | 370/466 |
| 6,205,142 B1 | 3/2001 | Vallee | |
| 6,490,268 B1 | 12/2002 | Lee et al. | |
| 6,510,166 B2 | 1/2003 | McClary | |
| 6,529,527 B1 | 3/2003 | Chen et al. | |
| 6,982,963 B2 * | 1/2006 | Asahina ....................... | 370/310 |
| 2002/0057662 A1 * | 5/2002 | Lim ............................ | 370/338 |
| 2002/0176427 A1 * | 11/2002 | Noda et al. .................. | 370/401 |
| 2003/0081582 A1 * | 5/2003 | Jain et al. .................... | 370/338 |

OTHER PUBLICATIONS

Request for Comments (RFC) 1662 entitled *PPP in HDLC-like Framing* dated Jul. 1994 edited by W. Simpson.

* cited by examiner

*Primary Examiner*—Ricky Q. Ngo
*Assistant Examiner*—Pao Sinkantarakorn
(74) *Attorney, Agent, or Firm*—Robert E. Bushnell, Esq.

(57) ABSTRACT

Disclosed is a packet data processing apparatus which processes packet data in a packet data serving node. In the apparatus, a separate hardware configuration of a PDSN performs de-framing and de-stuffing for a PPP frame provided from a BTS, thereby generating an IP frame, and then outputs the generated IP frame to the Internet network. Further, another separate hardware configuration of the PDSN frames and stuffs an IP frame transferred from the Internet network, thereby generating a PPP frame, and then transfers the generated PPP frame through the BTS to corresponding MS. Therefore, processing speed of a line card performing interfacing with the BTS, and the performance of the entire PDSN can be improved. Moreover, problems due to data processing are prevented from being caused, since many functions in relation to PPP have been realized by hardware.

18 Claims, 8 Drawing Sheets

US 7,327,762 B2

PACKET DATA PROCESSING APPARATUS IN PACKET DATA COMMUNICATION SYSTEM

CLAIM OF PRIORITY

This application claims priority to an application entitled PACKET DATA PROCESSING APPARATUS IN PACKET DATA COMMUNICATION SYSTEM filed in the Korean Intellectual Property Office on Jun. 26, 2002 and assigned Ser. No. 2002-35985, the contents of which are hereby incorporated by reference.

BACKGROUND OF THE INVENTION

1. Technical Field

The present invention relates to a packet data processing apparatus in a packet data communication system, and more particularly to a packet data processing apparatus which processes packet data in a packet data serving node.

2. Related Art

In general, "packet data communication system" is a general name for communication systems in which packet data are transmitted and received between a transmitting side and a receiving side. Packet data communication systems can be classified into wire packet data communication systems utilizing a wire network and mobile packet data communication systems utilizing a wireless network. Each of the mobile packet data communication systems requires a Wireless Access Gateway (WAG) for connection between a Mobile Station (MS) and the Internet network.

I have found that a packet data communication system may be improved when the performance of a Wireless Access Gateway is improved. Exemplars of recent efforts in the arts relating to packet data communication are disclosed, for example, in Request for Comments (RFC) 1662 entitled PPP in HDLC-like Framing dated July 1994 edited by W. Simpson, U.S. Pat. No. 6,529,527 to Chen et al., entitled METHOD AND APPARATUS FOR CARRYING PACKETIZED VOICE AND DATA IN WIRELESS COMMUNICATION NETWORKS, issued on Mar. 4, 2003, U.S. Pat. No. 6,510,166 to McClary, entitled STUFFING FILTER MECHANISM FOR DATA TRANSMISSION SIGNALS, issued on Jan. 21, 2003, U.S. Pat. No. 6,490,268 to Lee et al., entitled METHOD OF PROVIDING BURST TIMING FOR HIGH-SPEED DATA TRANSMISSION IN A BASE STATION TRANSCEIVER SYSTEM OF A MOBILE COMMUNICATION SYSTEM, issued on Dec. 3, 2002, and U.S. Pat. No. 6,205,142 to Vallee, entitled INVERSE MULTIPLEXING OF DIGITAL DATA, issued on Mar. 20, 2001. While these contemporary efforts contain merit, it is my observation that further improvements can also be contemplated.

SUMMARY OF THE INVENTION

The present invention provides a packet data processing apparatus in a packet data communication system, in which a portion of functions of a Packet Data Serving Node (PDSN) can be performed by hardware. A Packet Data Serving Node (PDSN) can be employed to function as a Wireless Access Gateway.

The present invention provides a packet data processing apparatus in a packet data communication system, which can reassemble fragmented Point to Point Protocol (PPP) packets in a General Routing Encapsulation (GRE) layer, which is an upper layer of an Internet Protocol (IP) layer between a Packet Data Serving Node (PDSN) and a Base Transceiver Station (BTS), into a complete Point to Point Protocol (PPP) frame when the Packet Data Serving Node (PDSN) has received the fragmented Point to Point Protocol (PPP) packets.

The present invention provides a packet data processing apparatus in a packet data communication system, which can convert a Point to Point Protocol (PPP) packet transferred from a Base Transceiver Station (BTS) into an Internet Protocol (IP) packet by performing byte de-stuffing and de-framing for the Point to Point Protocol (PPP) packet, and then can transfer the Internet Protocol (IP) packet to the Internet network.

The present invention provides a packet data processing apparatus in a packet data communication system, which can convert an Internet Protocol (IP) packet transferred from the Internet network into a Point to Point Protocol (PPP) packet by performing byte stuffing and framing for the Internet Protocol (IP) packet, and then can transfer the Point to Point Protocol (PPP) packet to a Base Transceiver Station (BTS).

The present invention provides a packet data processing apparatus in a packet data communication system, in which configurative elements for performing byte de-stuffing and de-framing, from among configurative elements for transferring data from a Base Transceiver Station (BTS) to the Internet network, are realized by hardware and operated in cooperation with the other configurative elements.

In accordance with a first aspect of the present invention, there is provided a de-framing method employed in a mobile communication system which includes a Base Transceiver Station (BTS), Mobile Stations (MS) linked through radio channels with the Base Transceiver Station (BTS), a Packet Data Serving Node (PDSN) connected with the Base Transceiver Station (BTS) through General Routing Encapsulation (GRE) tunneling by means of a Point to Point Protocol (PPP), and a host connected with the Packet Data Serving Node (PDSN) through an Internet network by means of an Internet Protocol (IP), the mobile communication system converting packet data (PPP data) from the Base Transceiver Station (BTS) based on the Point to Point Protocol (PPP) into other packet data (IP data) based on the Internet Protocol (IP) and then transferring the Internet Protocol (IP) data to the host, the Packet Data Serving Node (PDSN) reassembling fragmented Point to Point Protocol (PPP) frame data, which are fragmented packet data according to the Point to Point Protocol (PPP), into one integrated piece of Point to Point Protocol (PPP) data in the de-framing method, the de-framing method comprising the steps of: a network controller, which has received the Point to Point Protocol (PPP) frame data, storing the Point to Point Protocol (PPP) frame data in a packet memory according to each Point to Point Protocol (PPP) session number of the Point to Point Protocol (PPP) frame data; and when reception of all Point to Point Protocol (PPP) frame data having an equal session number has been completed, a Point to Point Protocol (PPP) de-framing processor reading corresponding Point to Point Protocol (PPP) frame data from the packet memory and reassembling the read Point to Point Protocol (PPP) frame data, thereby generating the Point to Point Protocol (PPP) data, wherein the network controller stores reassembling information, which is necessary in order to reassemble the Point to Point Protocol (PPP) frame data having the Point to Point Protocol (PPP) session number, together with the Point to Point Protocol (PPP) frame data when the network controller stores the Point to Point Protocol (PPP) frame data according to each Point to Point Protocol (PPP) session number.

In accordance with a second aspect of the present invention, there is provided a de-framing apparatus employed in a mobile communication system which includes a Base Transceiver Station (BTS), Mobile Stations (MS) linked through radio channels with the Base Transceiver Station (BTS), a Packet Data Serving Node (PDSN) connected with the Base Transceiver Station (BTS) through General Routing Encapsulation (GRE) tunneling by means of a Point to Point Protocol (PPP), and a host connected with the Packet Data Serving Node (PDSN) through an Internet network by means of an Internet Protocol (IP), the mobile communication system converting packet data (PPP data) from the Base Transceiver Station (BTS) based on the Point to Point Protocol (PPP) into other packet data (IP data) based on the Internet Protocol (IP) and then transferring the Internet Protocol (IP) data to the host, the Packet Data Serving Node (PDSN) reassembling fragmented Point to Point Protocol (PPP) frame data, which are fragmented packet data according to the Point to Point Protocol (PPP), into one integrated piece of Point to Point Protocol (PPP) data in the de-framing apparatus, the de-framing apparatus comprising the steps is of: a network controller receiving the Point to Point Protocol (PPP) frame data, and outputting the Point to Point Protocol (PPP) frame data together with reassembling information according to each Point to Point Protocol (PPP) session number of the Point to Point Protocol (PPP) frame data, the reassembling information having been negotiated when a Point to Point Protocol (PPP) link between the Base Transceiver Station (BTS) and the network controller is set; a packet memory storing the Point to Point Protocol (PPP) frame data and the reassembling information from the network controller according to each Point to Point Protocol (PPP) session number of the Point to Point Protocol (PPP) frame data; and a Point to Point Protocol (PPP) de-framing processor, which, when reception of all Point to Point Protocol (PPP) frame data having an equal Point to Point Protocol (PPP) session number has been completed, reads Point to Point Protocol (PPP) frame data having the equal Point to Point Protocol (PPP) session number and the reassembling information from the packet memory, and reassembles the read Point to Point Protocol (PPP) frame data according to the reassembling information, thereby generating the Point to Point Protocol (PPP) data.

In accordance with a third aspect of the present invention, there is provided a framing method employed in a mobile communication system which includes a Base Transceiver Station (BTS), Mobile Stations (MS) linked through radio channels with the Base Transceiver Station (BTS), a Packet Data Serving Node (PDSN) connected with the Base Transceiver Station (BTS) through General Routing Encapsulation (GRE) tunneling by means of a Point to Point Protocol (PPP), and a host connected with the Packet Data Serving Node (PDSN) through an Internet network by means of an Internet Protocol (IP), the mobile communication system converting packet data (IP data) from the host based on the Internet Protocol (IP) into other packet data (PPP data) based on the Point to Point Protocol (PPP) and then transferring the Point to Point Protocol (PPP) data to the Base Transceiver Station (BTS), the Packet Data Serving Node (PDSN) framing the Point to Point Protocol (PPP) data into multiple pieces of fragmented Point to Point Protocol (PPP) frame data, which are fragmented packet data according to the Point to Point Protocol (PPP), the de-framing method comprising the steps of: a network controller, which has received the Point to Point Protocol (PPP) data, storing the Point to Point Protocol (PPP) data together with control information corresponding to the Point to Point Protocol (PPP) data in a packet memory; and a Point to Point Protocol (PPP) framing processor reading the Point to Point Protocol (PPP) data together with control information corresponding to the Point to Point Protocol (PPP) data from the packet memory and fragmenting the read Point to Point Protocol (PPP) data into multiple pieces of Point to Point Protocol (PPP) frame data according to size information included in the control information, wherein, from among the fragmented multiple pieces of Point to Point Protocol (PPP) frame data, a start flag and an end flag are inserted in first Point to Point Protocol (PPP) frame data and last Point to Point Protocol (PPP) frame data, respectively, and then the multiple pieces of Point to Point Protocol (PPP) frame data are transmitted to the Base Transceiver Station (BTS).

In accordance with a fourth aspect of the present invention, there is provided a framing apparatus employed in a mobile communication system which includes a Base Transceiver Station (BTS), Mobile Stations (MS) linked through radio channels with the Base Transceiver Station (BTS), a Packet Data Serving Node (PDSN) connected with the Base Transceiver Station (BTS) through General Routing Encapsulation (GRE) tunneling by means of a Point to Point Protocol (PPP), and a host connected with the Packet Data Serving Node (PDSN) through an Internet network by means of an Internet Protocol (IP), the mobile communication system converting packet data (IP data) from the host based on the Internet Protocol (IP) into other packet data (PPP data) based on the Point to Point Protocol (PPP) and then transferring the Point to Point Protocol (PPP) data to the Base Transceiver Station (BTS), the Packet Data Serving Node (PDSN) framing the Point to Point Protocol (PPP) data into multiple pieces of fragmented Point to Point Protocol (PPP) frame data, which are fragmented packet data according to the Point to Point Protocol (PPP), the de-framing apparatus comprising: a network controller, which receives the Point to Point Protocol (PPP) data and outputs the received Point to Point Protocol (PPP) data together with control information corresponding to the Point to Point Protocol (PPP) data; a packet memory, which stores the Point to Point Protocol (PPP) data and the control information provided from the network controller; and a Point to Point Protocol (PPP) framing processor, which reads the Point to Point Protocol (PPP) data together with control information corresponding to the Point to Point Protocol (PPP) data from the packet memory and fragments the read Point to Point Protocol (PPP) data into multiple pieces of Point to Point Protocol (PPP) frame data according to size information included in the control information, wherein, the Point to Point Protocol (PPP) framing processor inserts a start flag and an end flag in first Point to Point Protocol (PPP) frame data and last Point to Point Protocol (PPP) frame data, respectively, from among the fragmented multiple pieces of Point to Point Protocol (PPP) frame data, and then transmits the multiple pieces of Point to Point Protocol (PPP) frame data to the Base Transceiver Station (BTS).

In accordance with the principles of the present invention, as embodied and broadly described, the present invention provides a deframing method, comprising: receiving PPP frame data corresponding to a session number, storing the PPP frame data in a packet memory in dependence upon the session number, and storing reassembling information corresponding to the session number, said receiving and said storing of the PPP frame data and said storing of the reassembling information being performed by a network controller, the PPP frame data being data conforming to a point-to-point protocol and being fragmented; and when said receiving has been completed, reading the PPP frame data from the packet memory and reassembling the read PPP frame data into one integrated piece of PPP packet data, said reading and reassembling being performed by a point-to-point protocol deframing processor, said reassembling being performed in dependence upon the reassembling information, the PPP packet data being data conforming to the point-to-point protocol, the point-to-point protocol deframing processor and network controller being included in a packet data serving node in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on the point-to-point protocol, the mobile communication system converting PPP frame data received from the base transceiver station into IP packet data and transferring the IP packet data to the host, the IP packet data conforming to the Internet protocol.

In accordance with the principles of the present invention, as embodied and broadly described, the present invention provides a deframing apparatus, comprising a packet data serving node in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on a point-to-point protocol, the mobile communication system converting PPP frame data received from the base transceiver station into IP packet data and transferring the IP packet data to the host, the PPP frame data conforming to a point-to-point protocol and being fragmented, the IP packet data conforming to an Internet protocol, the PPP frame data corresponding to a session number, said packet data serving node comprising: a network controller receiving the PPP frame data and outputting the PPP frame data together with reassembling information in dependence upon the session number corresponding to the PPP frame data, the reassembling information having been negotiated when a point-to-point protocol link between the base transceiver station and said network controller is set; a packet memory being in communication with said network controller, said packet memory storing the PPP frame data and the reassembling information received from the network controller in dependence upon the session number corresponding to the PPP frame data; and a point-to-point protocol deframing processor being in communication with the network controller, said point-to-point protocol deframing processor reading the PPP frame data corresponding to the session number and reading the reassembling information from the packet memory and reassembling the read PPP frame data according to the reassembling information when reception of all PPP frame data corresponding to the session number has been completed, to generate one integrated piece of PPP packet data, the PPP packet data being data conforming to the point-to-point protocol.

In accordance with the principles of the present invention, as embodied and broadly described, the present invention provides a framing method, comprising: storing PPP packet data and control information corresponding to the PPP packet data in a packet memory, said storing being performed by a network controller, the PPP packet data being one integrated piece of PPP packet data and conforming a point-to-point protocol; reading the PPP packet data and the control information from the packet memory; and fragmenting the read PPP packet data into a plurality of pieces of PPP frame data according to size information included in the control information, the PPP frame data being data conforming the point-to-point protocol, said reading and fragmenting being performed by a point-to-point protocol framing processor, the plurality of pieces of PPP frame data including a first piece of PPP frame data and a last piece of PPP frame data, with a start flag being inserted into the first piece of PPP frame data and an end flag being inserted into the last piece of PPP frame data, the plurality of pieces of PPP frame data being transmitted to a base transceiver station, the network controller and the point-to-point protocol framing processor being included in a packet data serving node in a mobile communication system, the mobile communication system including the base transceiver station, a plurality of mobile stations linked through radio channels with the base transceiver station, and a host connected with the packet data serving node through an Internet network based on an Internet protocol, the packet data serving is node being connected with the base transceiver station through general routing encapsulation tunneling based on the point-to-point protocol, the mobile communication system converting IP packet data received from the host into the PPP frame data and transferring the PPP frame data to the base transceiver station, the IP packet data conforming to the Internet protocol.

In accordance with the principles of the present invention, as embodied and broadly described, the present invention provides a framing apparatus, comprising: a packet data serving node in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on a point-to-point protocol, the mobile communication system converting IP packet data received from the host into a plurality of pieces of PPP frame data and transferring the pieces of the PPP frame data to the base transceiver station, the IP packet data conforming to an Internet protocol, said packet data serving node framing one integrated piece of PPP packet data into a plurality of pieces of the PPP frame data, the plurality of pieces of the PPP frame data including a first piece of PPP frame data and a last piece of PPP frame data, the PPP packet data conforming to a point-to-point protocol, the PPP frame data conforming the point-to-point protocol and being fragmented, each of the pieces of the PPP frame data corresponding to a session number, said packet data serving node comprising: a network controller receiving the PPP packet data and outputting the received PPP packet data with control information corresponding to the PPP packet data; a packet memory being in communication with said network controller, said packet memory storing the PPP packet data and the control information provided from said network controller; and a point-to-point protocol framing processor being in communication with said network controller, said point-to-point protocol framing processor reading the PPP packet data with the control information corresponding to the PPP packet data from said packet memory and fragmenting the read PPP packet data into a plurality of pieces of PPP frame data in accordance with size information included in the control information, said point-to-point protocol framing processor inserting a start flag into the first piece of PPP frame data and an end flag into the last piece of PPP frame data and transmitting the plurality of pieces of PPP frame data to the base transceiver station.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF BEST MODE OF CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
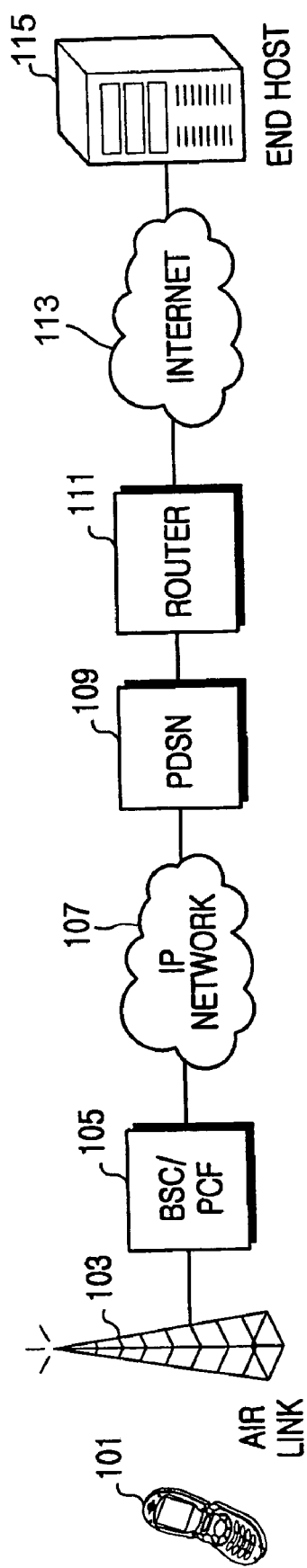
FIG. 1 illustrates a construction of a packet data communication system.

FIG. 1 illustrates a construction of a packet data communication system. Also, FIG. 1 illustrates a construction of a mobile packet data communication system. The mobile packet data communication system shown in FIG. 1 is a reference model of a packet data network for next generation mobile communication, in which connection is made in such a way as "MS⇆BSC/PCF ⇆IP Network⇆PDSN⇆IP Network⇆End host".

Referring to FIG. 1, user packet data from a Mobile Station (MS) 101 are transmitted to a Base Transceiver Station (BTS) 103 through a predetermined backward traffic channel on an air link. Meanwhile, the MS 101 receives packet data from the BTS through a predetermined forward traffic channel. The BTS 103 transfers packet data received from the MS 101 to a Base Station Controller/Packet Control Function (BSC/PCF) 105. The BTS 103 transfers packet data received from the BSC/PCF 105 to the MS 101. The BSC/PCF 105 uses a Packet Control Function (PCF) in transmitting packet data received from the BTS 103 to a PDSN 109 through an Internet Protocol (IP) network 107. Also, the BSC 105 transmits packet data provided through the IP Network 107 from the PDSN 109 to the BTS 103. The PDSN 109 receives packet data from the BSC/PCF 105 through the IP Network 107 and transmits the packet data to a router 111. Also, the PDSN 109 transmits packet data from the router 111 to the BSC/PCF 105 through the IP Network 107. The router 111 exchanges packet data with an end host 115 through the Internet 113. Usually, an IP packet is used between the router 111 and the end host 115.

With reference to FIG. 1, in the communication system having the construction described above, a PPP frame is used as the packet data between the BSC/PCF 105 and the PDSN 109, and an IP packet is used as the packet data between the PDSN 109 and the end host 115. That is, user packet data are transmitted/received according to a PPP protocol between the MS 101 and the PDSN 109, and the PDSN 109 and the end host 115 are connected to each other through the Internet 113 according to an IP (Internet Protocol). Therefore, in order to enable the PDSN 109 to transmit the PPP frame from the BSC/PCF 105 to the router 111, a predetermined packet data processing for converting the PPP frame into an IP packet is required. Further, in order to enable the PDSN 109 to transmit the IP frame from the router 111 to the BSC/PCF 105, a predetermined packet data processing for converting the IP frame into a PPP frame is required. Herein, the PPP frame is also referred to as "PPP packet data". In order to convert the PPP packet data into IP packet data, the PDSN 109 performs "byte de-stuffing" and "PPP de-framing" in accordance with the Request for Comments (RFC) 1662 entitled PPP in HDLC-like Framing dated July 1994 edited by W. Simpson. Also, in order to convert the IP packet data into PPP packet data, the PDSN 109 performs "byte stuffing" and "PPP framing".

Figure 2:
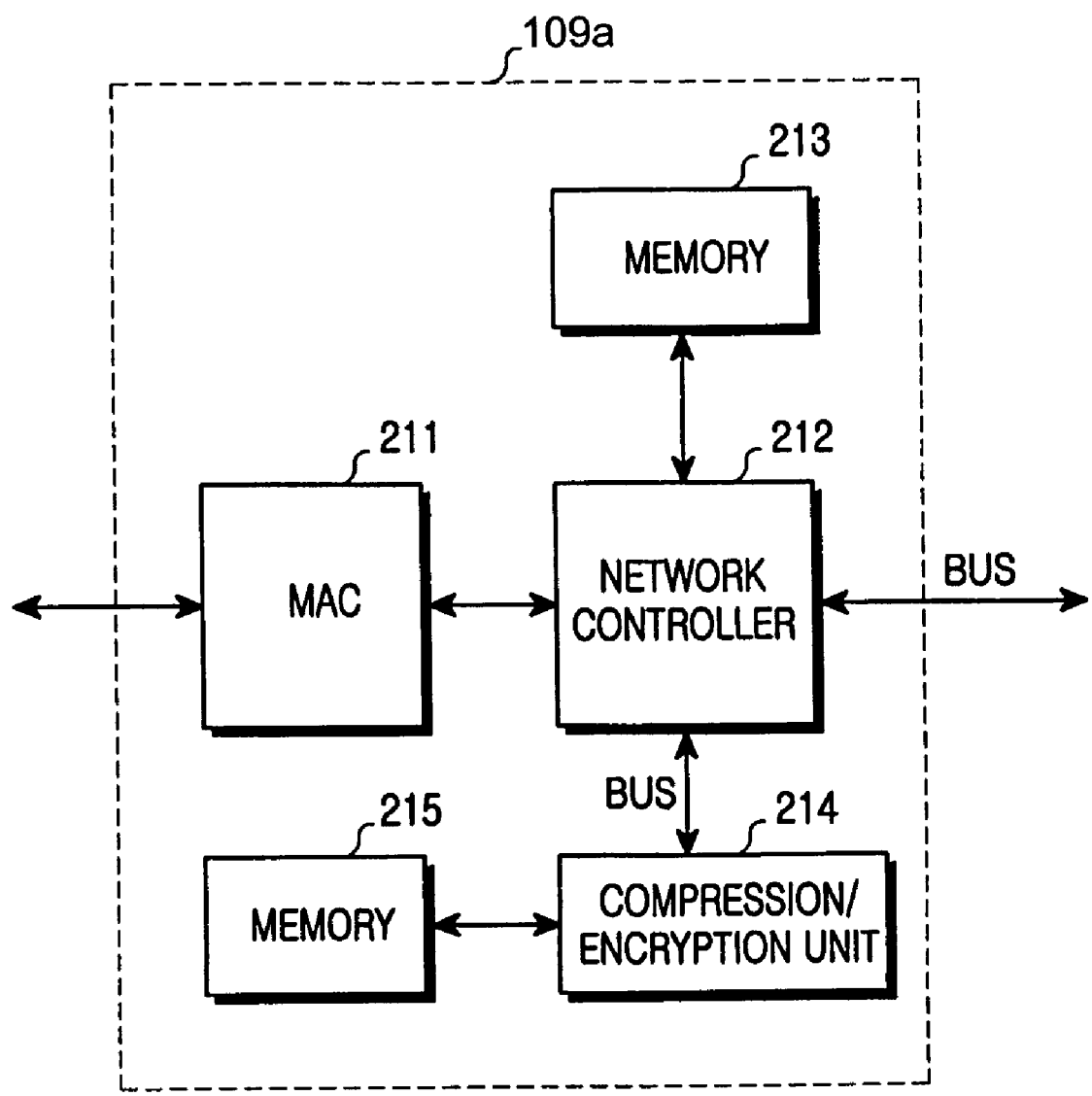
FIG. 2 is a block diagram showing a detailed construction of the Packet Data Serving Node (PDSN) shown in FIG. 1.

FIG. 2 is a block diagram showing a detailed construction of the Packet Data Serving Node (PDSN) shown in FIG. 1. The functions of the PDSN 109a will be described with reference to FIGS. 1 and 2. In the discussion of the details shown in FIG. 2, the PDSN 109a of FIG. 2 corresponds to the PSDN 109 shown in FIG. 1.

The PDSN 109a shown in FIG. 2 utilizes software to perform functions, as described herein. The network controller 212 shown in FIG. 2 generates IP packets by performing PPP de-framing and byte de-stuffing purely by means of software. The network controller 212 shown in FIG. 2 uses software in generating the PPP frame packet from the IP packet according to the PPP session by the PPP framing. Further, the network controller 212 shown in FIG. 2 performs byte stuffing to provide a control characteristic to predetermined byte data of an information field while performing the PPP framing by software.

With reference to FIG. 1, a link layer between the PDSN 109 and the PCF of the BSC/PCF 105 employs a fast ethernet (FE). The PCF of the BSC/PCF 105 is connected to the PDSN 109 by means of tunneling for General Routing Encapsulation (GRE). Therefore, the PCF of the BSC/PCF 105 transmits the PPP packet data, which have been transmitted on a Point to Point Protocol (PPP) from the MS 101, to the PDSN 109 via a GRE tunnel connected by the GRE tunneling. The PCF of the BSC/PCF 105 fragments most of user data packets received from a plurality of MSs linked through a large number of radio channels and then transmits the mostly-fragmented user data packets as the PPP packet data. Therefore, the PDSN 109 must reassemble the fragmented PPP data packets into a complete message through the PPP de-framing. For this reassembling, the PPP packet data transmitted to the PDSN 109 includes a GRE header having a specific key value and sequence number in the GRE tunnel. The key value matches a specific PPP session of each MS, and the sequence number is information necessary in order to reassemble the fragmented PPP data packets into a complete message through the PPP de-framing.

With reference to FIG. 1, meanwhile, the PDSN 109 generates PPP data packets of a type required by the PCF of the BSC/PCF 105 through PPP framing and byte stuffing of the IP packet data received from the Internet 113 through the router 111. For this, the PDSN 109 searches for a PPP session corresponding to the IP packets from the Internet 113 and performs PPP communication according to an established option of a PPP link of the corresponding PPP session.

In reflecting the above description on the construction shown in FIG. 2, the packet data of the Mobile Stations (MSs) linked through a large number of radio channels are transmitted as PPP data packets from the PCF of the BSC/PCF 105. A Medium Access Control (MAC) header is eliminated from a PPP data packet while the PPP data packet passes a MAC 211. The PPP data packet without the MAC header is provided to a network controller 212. The network controller 212 confirms an IP address possessed by the received PPP data packet, and determines whether the confirmed IP address is the same as the IP address of the network controller 212. When the confirmed IP address is the same as the IP address of the network controller 212, the network controller 212 eliminates the IP header from the PPP data packet and analyzes the GRE header of the PPP data without the IP header. When the network controller 212 confirms the key value and sequence number by analyzing the GRE header, the network controller 212 provides the key value to a content addressable memory CAM (not shown) and searches for a PPP session number. Further, the network controller 212 checks by the sequence numbers whether the PPP frame packets in the tunnel have been received in regular sequence or not. Then, the network controller 212 generates IP packets by performing the PPP de-framing and byte de-stuffing purely by means of software. That is, the network controller 212 performs the PPP de-framing after finding a start flag and an end flag of a PPP frame according to a PPP session corresponding to the key value analyzed from the GRE header of the PPP data packet by software. By the PPP de-framing, the network controller 212 reassembles each fragmented PPP frame data, thereby generating an IP packet according to each frame data. Further, while the network controller 212 performs the PPP de-framing by software, the network controller 212 finds and eliminates a Control Escape Character in the PPP information field and performs byte de-stuffing for restoring a Control Character following the Control Escape Character to original byte data.

Further, with continued reference to FIG. 2, in the backward direction from the PDSN 109a to the MS 101, the network controller 212 uses software in finding a PPP session corresponding to an IP packet inputted from the end host 115 and then performing PPP communication with the MS 101 according to a PPP link establishment option of the corresponding session. That is, the network controller 212 uses software in generating the PPP frame packet from the IP packet according to the PPP session by the PPP framing. Further, the network controller 212 performs byte stuffing to provide a control characteristic to predetermined byte data of an information field while performing the PPP framing by software.

With reference to FIG. 2, the PPP data packet between the MS 101 and the PDSN 109a may be subjected to PPP compression and encryption. The PPP compression and encryption is performed by cooperation between the network controller 212 and a compression/encryption unit 214 provided in the PDSN 109a. Further, after a PPP link between the MS 101 and the PDSN 109a matches a new IP address, the PDSN 109 applies IP security to the IP packet from the MS 101 to the Internet 113 by means of the cooperation between the network controller 212 and the compression/encryption unit 214. A memory 215 is utilized in conjunction with the compression/encryption unit 214.

With reference to FIG. 2, as noted from the above description, the network controller 212 analyzes a GRE header of a received PPP data packet and confirms a PPP session number corresponding to a key value included in the GRE header. When the PPP session number has been confirmed, the confirmed PPP session number has been mapped to the IP address. Herein, the network controller 212 performs all of the operations described above by software. Further, the network controller 212 eliminates the GRE headers from the PPP data packets and stores the PPP data packets without the GRE header in a temporary packet memory 213 according to the PPP session numbers. Then, the network controller 212 de-frames the PPP frame by the data stored in the temporary packet memory 213, so that load between the network controller 212 and the temporary packet memory 213 increases very much. Moreover, the PPP data packets in the GRE tunnel may be segmented packets, and, in this case, there may exist either more than one start and end flags or only one start flag and end flag of the PPP data packet in the GRE tunnel. Therefore, it is a heavy burden for the network controller 212 to confirm all of the packets to search for the start flag and end flag and then perform the de-framing and de-stuffing only by software.

As described above, the PDSN 109a of FIG. 2 uses software in performing all of the serial processes for the packet data. Therefore, the performance of the communication system deteriorates due to the excessive load to the network control unit for processing the packet data, thereby naturally causing many problems in an aspect that the communication system should support high speed service hereafter.

With reference to FIG. 2, in a mobile communication network, when the PDSN 109a receives the fragmented PPP packets in a GRE which is a higher layer of the IP layer between the BSC/PCF and the PDSN, the PDSN reassembles the fragmented PPP packets into a complete PPP frame and performs PPP byte de-stuffing by software. Therefore, excessive loads are applied to processors in the PDSN, which perform the corresponding functions. As a result, processing of s the PPP protocol data is delayed, deteriorating the performance of the entire system, and thereby significantly deteriorating both the speed at which MSs connect with the Internet as well as the Internet service quality provided to the MSs. Moreover, a limited number of processors on a system board perform a large number of functions. Especially, as the limited number of processors perform IP security (IPSec), encryption/description, compression/decompression, etc., which are functions of the PDSN, the performance of the entire system deteriorates further.

In other words, in the art described above regarding FIG. 2, most of the serial functions are performed by software, and a network controller or network processor (NP) has so many jobs to do by software that improvement in the performance of the PDSN 109a cannot be anticipated. That is, in consideration of the processing speed hereafter, too heavy a load is laid on processing the PPP data between the MS and the PDSN 109a by software. Especially, in relation to the PPP, since framing, de-framing, stuffing, de-stuffing, many labors for reconstructing the fragmented PPP frame data in the GRE tunnel, etc., are processed by software, too heavy a load is laid on software elements of the system, and it is thus necessary to process more jobs by hardware in order to prevent the performance of the entire PDSN 109a from deteriorating.

Hereinafter, embodiments of the present invention will be described with reference to the accompanying drawings. First, the present invention enables some configurations of a PDSN to be realized by hardware instead of software, which is believed to be an improvement over the configuration of the PDSN 109a shown in FIG. 2.

In the discussion of FIG. 2, the PDSN 109a shown in FIG. 2 corresponds to the PSDN 109 shown in FIG. 1. In the discussion of FIGS. 3-8, regarding the principles of the present invention, the PDSN 210 shown in FIG. 5 corresponds to the PSDN 109 shown in FIG. 1. The PDSN 109a of FIG. 2 and the PDSN 210 of FIG. 5 have some features in common, but those two. PDSNs are not identical.

Specifically, in the present invention, the PPP framing and de-framing, byte stuffing, and byte de-stuffing functions of a PDSN are realized by hardware instead of software, so that performance of an interface line card constituting the PDSN is improved, a much higher speed packet processing system supporting a high speed interface between an MS and the PDSN can be manufactured, and the WAG function between the MS and the Internet network can be more stably realized.

Figure 5:
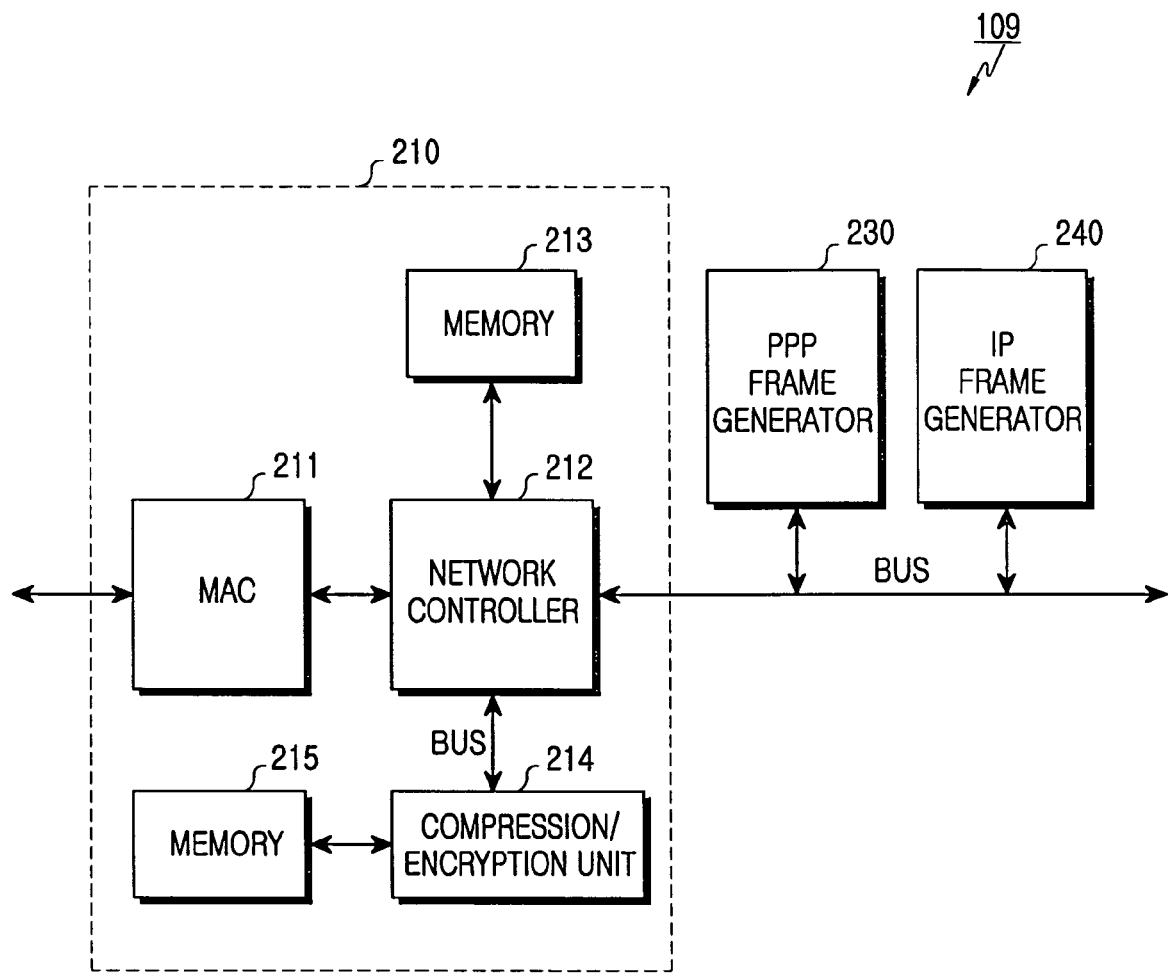
FIG. 5 is a block diagram showing a detailed construction of a Packet Data Serving Node (PDSN) of an embodiment of the present invention.

In the present invention, PPP framing data are subjected to GRE tunneling and exchanged between the MS and the PDSN, and, from among the functions of the PDSN, the PPP framing, byte stuffing, PPP de-framing, and byte de-stuffing are performed by hardware. The other functions of the PDSN for packet processing are performed as per the method utilizing software in packet processing, as described above with reference to FIGS. 1 and 2. Therefore, in the following description, a detailed description of a process according to the method described above with reference to FIGS. 1 and 2 in cooperation with a processing according to the present invention will be omitted. The PDSN 210 shown in FIG. 5 is is not identical to the PDSN 109a shown in FIG. 2 for several reasons, including the fact that the PDSN 109a shown in FIG. 2 does not include generators 230 and 240. However, there are some similarities, for example the PDSN 210 of FIG. 5 and the PDSN 109a of FIG. 2 both include a compression/encryption unit 214.

Figure 3:
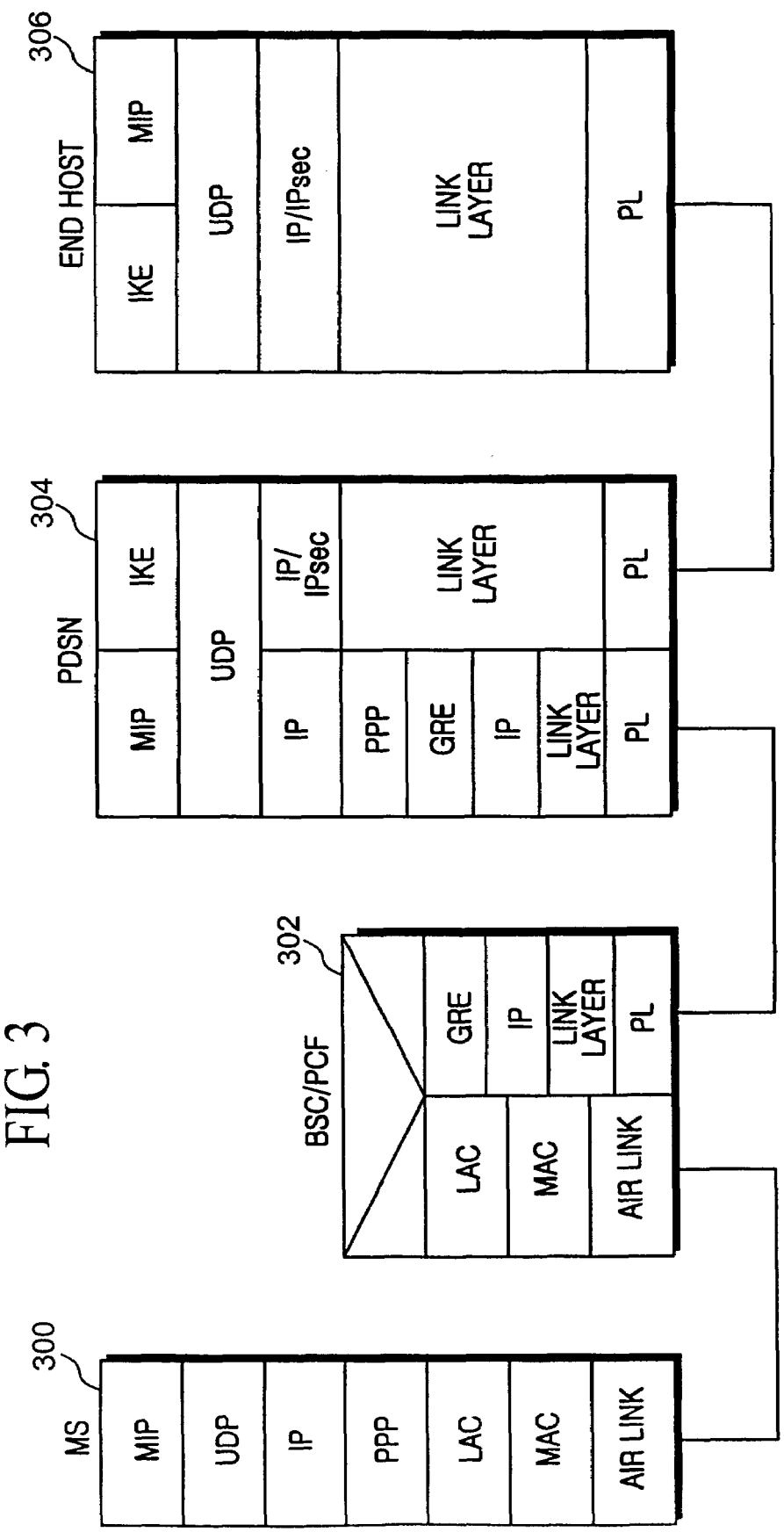
FIG. 3 shows a stack architecture of a packet data communication network of an embodiment of the present invention.

FIG. 3 shows a stack architecture of a packet data communication network according to an embodiment of the present invention. As shown in FIG. 3, a frame format (PPP frame format) between an MS and a PDSN has a layer structure of Link layer/IP/GRE/PPP/IP/High layers, and data of the PPP frame format are fragmented in the PDSN. That is known as PPP termination. Therefore, from the PDSN, an IP header is added to a user data packet of each MS, thereby converting the user data packet into an IP packet with an IP header.

Referring to FIG. 3, when a user data packet which will be transmitted from an upper layer such as multi-channel interface processor (MIP) or UDP is generated, the MS sends the user data packet down to the IP layer, as shown in stack 300. Then, the IP layer classifies the user data packet according to the destination of the user data packet and sends the user data packet down to the PPP layer which is an end-to-end protocol. The PPP layer transmits the user data packet sequentially through the loop assignment center (LAC) layer, the MAC layer, and the Air Link layer, and then by the air. The LAC layer and MAC layer follow a standard of IS-2000, which is a mobile communication standard, and the MAC layer performs connection of a Radio Link Protocol (RLP) of channels between the MS, BTS, and BSC.

The data transmitted through the air as described above are received by the Air Link layer of the BTS or BSC, and are then transferred through the MAC layer and the LAC layer, as shown in stack 302. The PPP frame transmitted through the LAC layer is provided to the GRE layer, in which a GRE header including a sequence number and a key value determining the PPP session number is added to the PPP frame. The PPP frame having the GRE header is provided to the PDSN through an IP layer, a Link Layer, and a Physical Layer (PL).

The data in a PPP frame format from the BSC/PCF are provided through a PL and a Link Layer to a lower IP layer in the PDSN, as shown in stack 304. In the lower IP layer, an IP header is eliminated from the PPP frame data, which are then provided to a GRE layer. The GRE layer analyzes the GRE header of the PPP frame data without the IP header to find the key value and the sequence number, and then eliminates the GRE header. Then, a PPP header and another IP header are eliminated from the PPP frame data without the GRE header in the PPP and upper IP layers, so that user data can be outputted. Thereafter, an IP header required by an IP network is added to the user data by the lower IP layer of the PDSN, and then the user data with the IP header are transferred through a Link Layer and a PL to the end host. Therefore, the data outputted from the PDSN has the configuration of an IP packet, as shown in stack 306. In the stack 304, the term IKE corresponds to Internet Key Exchange.

As described above, between the BSC/PCF and the PDSN, the PPP frame data are transmitted/received by the GRE tunneling through an IP network which has a fast ethernet as a data link layer, and the PPP frame data from the BSC/PCF may be provided to the PDSN after being fragmented. Further, the GRE header information includes a key value which represents a PPP session for each MS and a sequence number for sequentially restoring each packet data through the IP network.

1.2 Frame Structure between MS and PDSN

Figure 4:
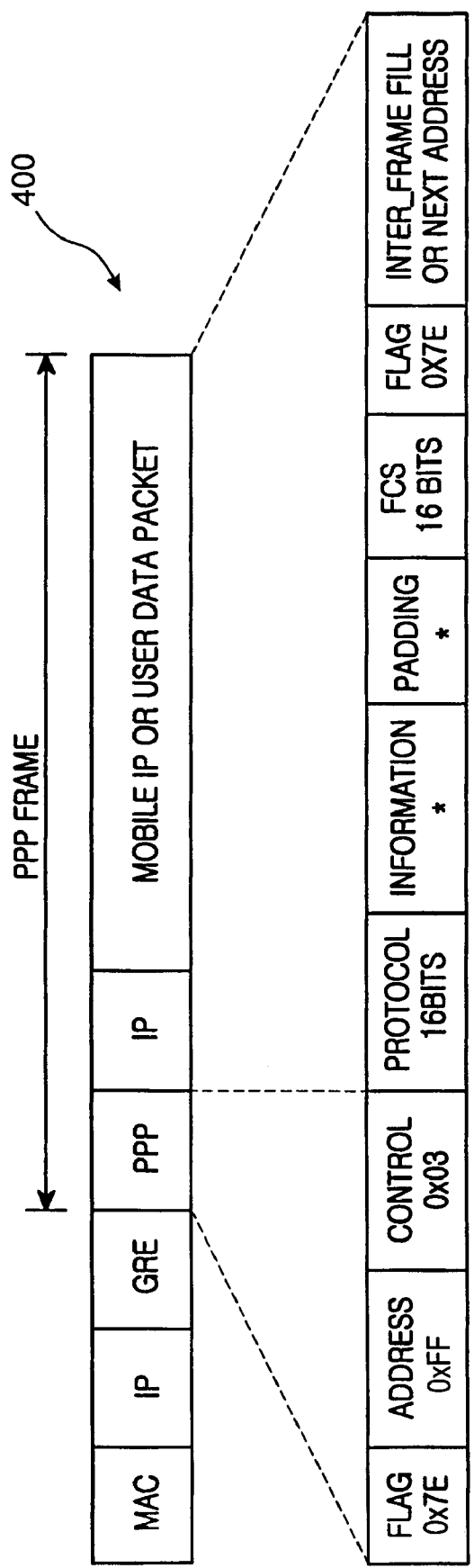
FIG. 4 shows a structure of a frame employed in order to transmit packet data between a Base Station Controller (BSC) and a Packet Data Serving Node (PDSN), in accordance with the principles of the present invention.

FIG. 4 shows a structure of a frame employed in order to transmit packet data between a Base Station Controller (BSC) and a Packet Data Serving Node (PDSN), in accordance with the principles of the present invention. In the frame 400 shown in FIG. 4, a PPP header includes a flag field, an address field, and a control field. The flag field is an area in which a start flag and an end flag are set. '0xFF' is recorded in the address field, and '0x03' is stored in the control field. Meanwhile, the other area (PPP information field) except for the PPP header may include '0x7D' which represents that byte stuffing has been performed. Therefore, a PPP information field including '0x7D' must be restored to original data through byte de-stuffing, in order to enable the frame to be converted to an IP packet.

1.3 Construction of PDSN

FIG. 5 is a block diagram showing a detailed construction of a Packet Data Serving Node (PDSN) of an embodiment of the present invention. As shown in FIG. 5, the PDSN 210 includes a PPP frame generator 230, which performs PPP framing and byte stuffing, and an IP frame generator 240, which performs PPP de-framing and byte de-stuffing, in addition to the configuration of the PDSN as described above with reference to FIG. 2. The PDSN 210 shown in FIG. 5, in accordance with the principles of the present invention, includes the configuration of the PDSN 109a shown in FIG. 2 and also the the PPP Frame Generator 230 and IP Frame Generator 240.

Referring to FIG. 5, the IP frame generator 240 receives the PPP frame from the MS 101 through the IP Network 107 and performs de-framing for generating an IP frame by means of the PPP frame. Further, when the data recorded in the information field of the PPP frame have been stuffed, the IP frame generator 240 cooperates with the above-described configuration of FIG. 2 to perform the de-stuffing operation for restoring the data. The PPP frame generator 230 receives the IP frame from the Internet 113 through the router 111 and performs framing for generating a PPP frame by the IP frame. Further, when stuffing is requested from the MS 101, the PPP frame generator 230 cooperates with the above-described configuration of FIG. 2 to perform the stuffing operation for stuffing specific data of the generated PPP frame. The PPP frame generator 230 and the IP frame generator 240 are connected with the network controller 212 through a predetermined bus for the cooperation with the above-described configuration of FIG. 2. Herein, the predetermined bus may be a peripheral connect interface (PCI) bus.

Figure 6:
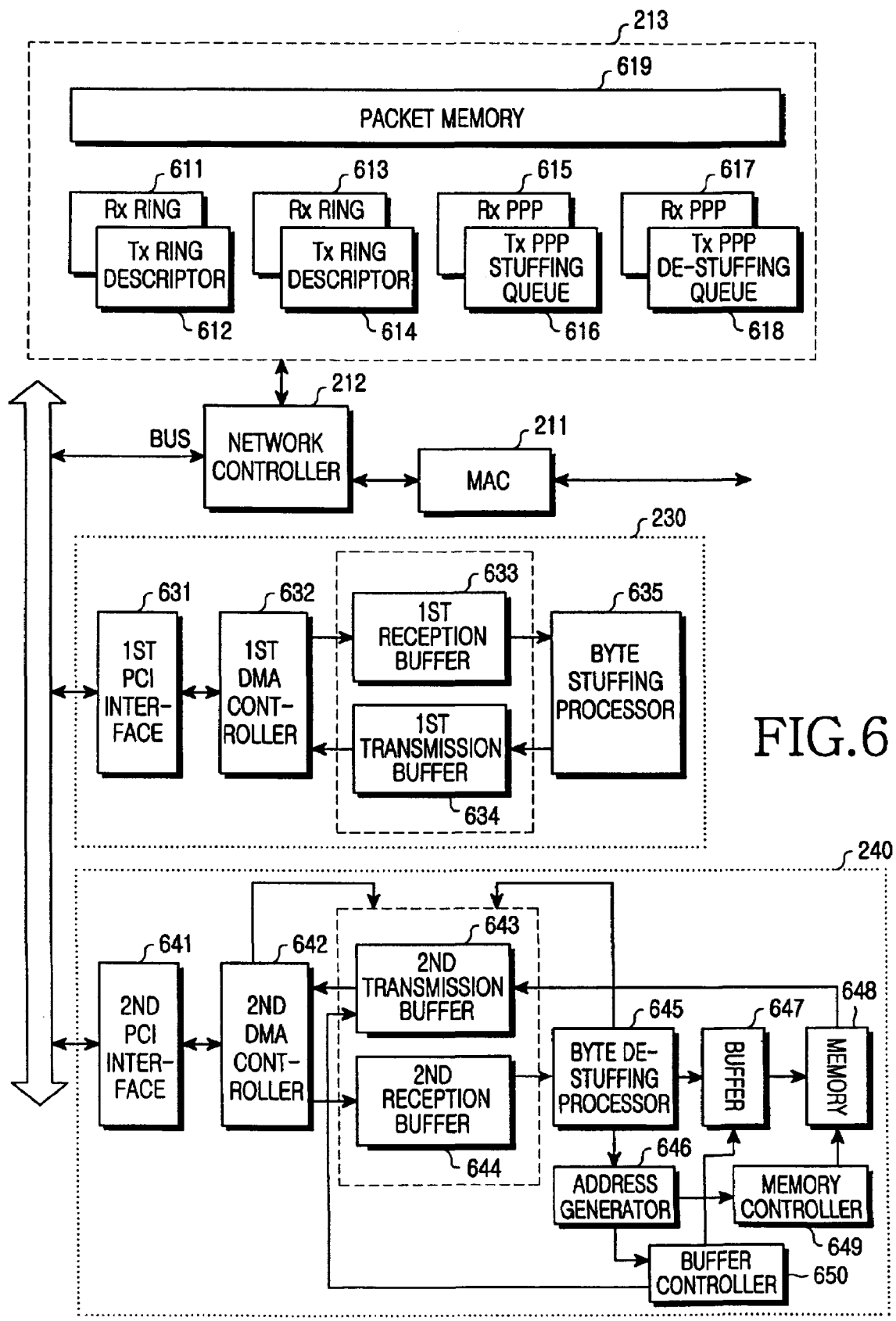
FIG. 6 is a block diagram illustrating, in detail, several configurative elements from among the construction shown in FIG. 5, in accordance with the principles of the present invention.

FIG. 6 is a block diagram illustrating, in detail, several configurative elements from among the construction shown in FIG. 5, in accordance with the principles of the present invention. FIG. 6 is a block diagram illustrating, in detail, the PPP frame generator 230, the IP frame generator 240, and the above-described configuration for the cooperation according to an embodiment of the present invention.

Figure 7:
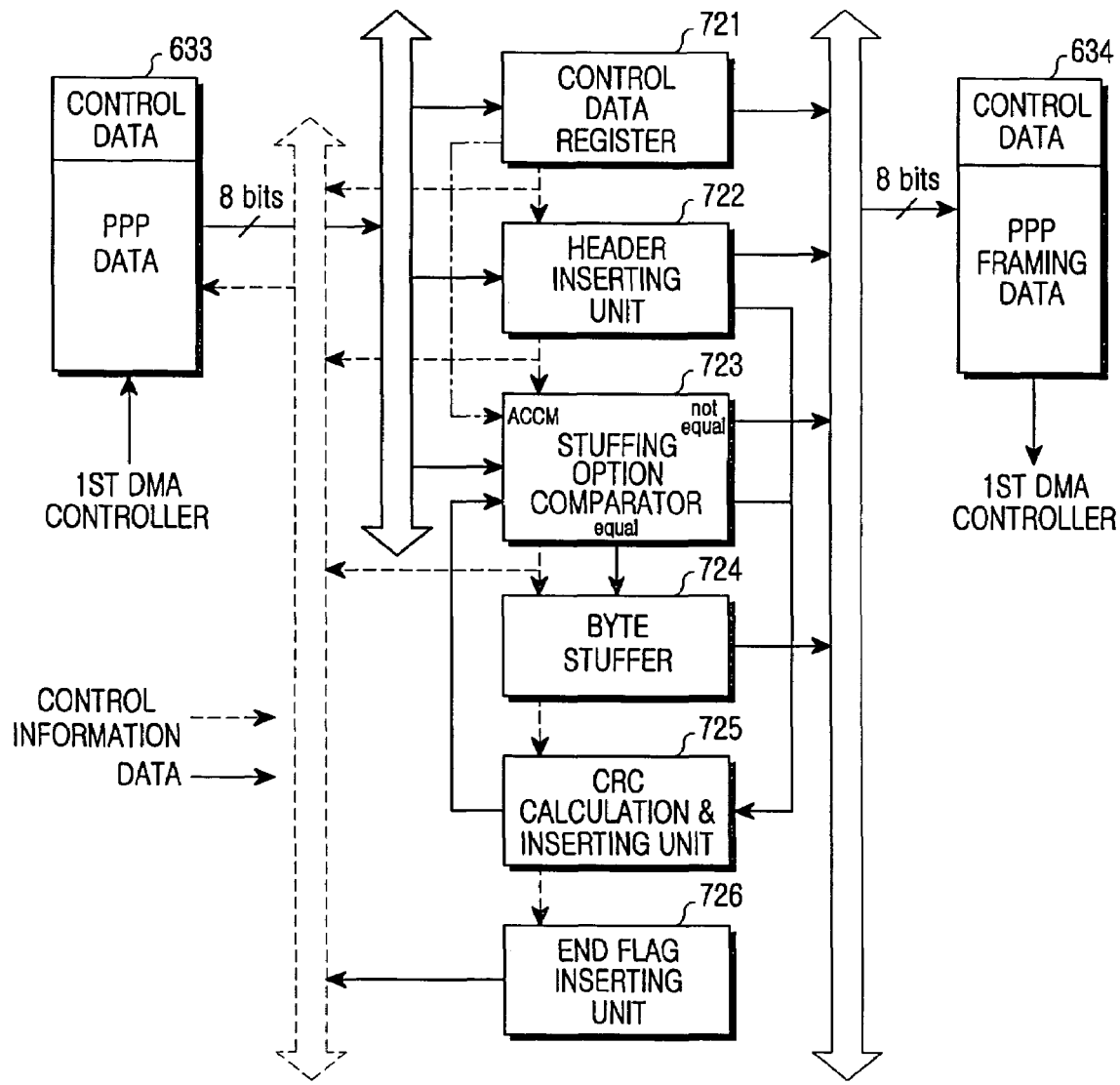
FIG. 7 is a block diagram illustrating a detailed configuration of the byte stuffing processor shown in FIG. 6, in accordance with the principles of the present invention.
Figure 8:
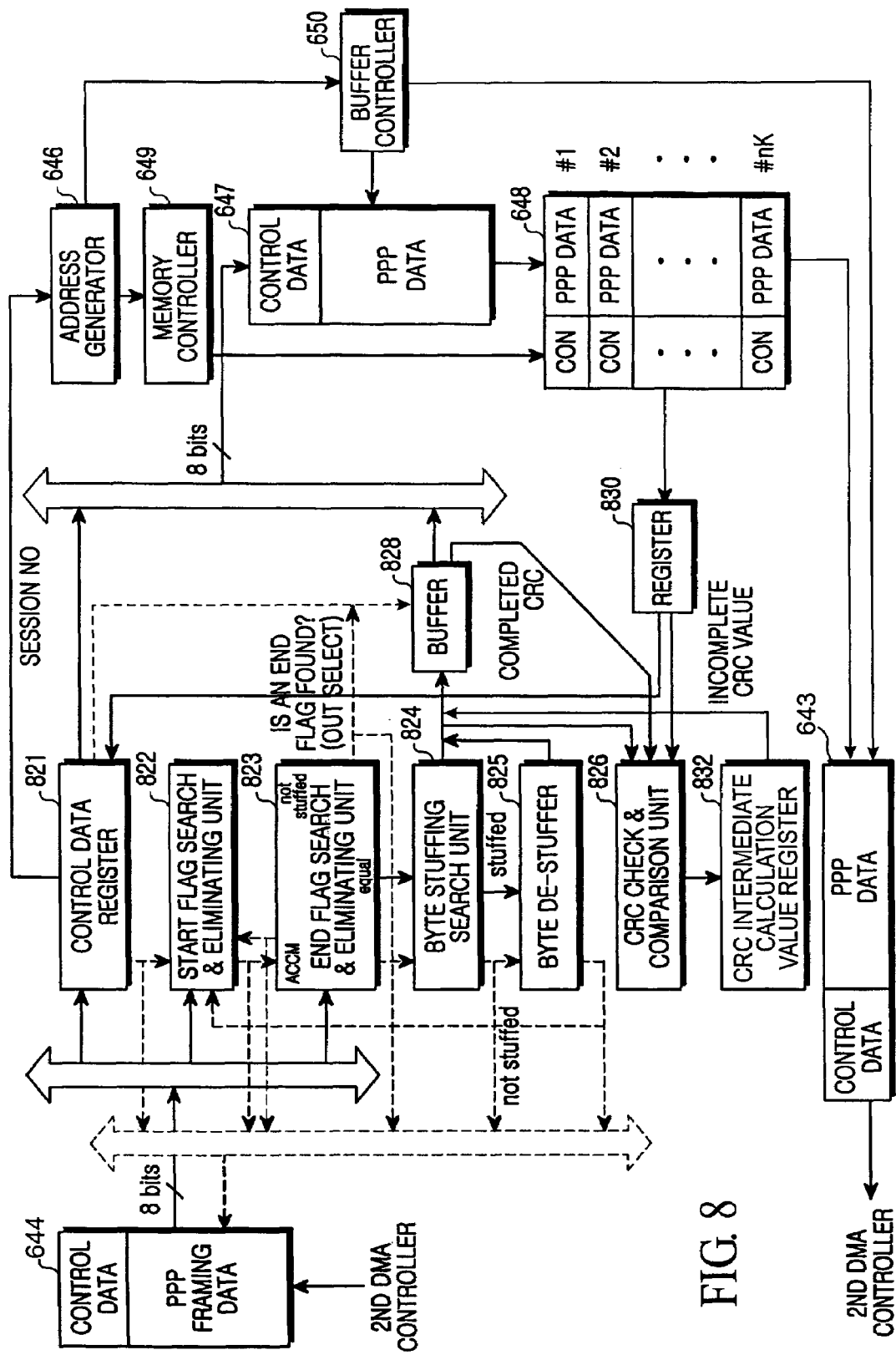
FIG. 8 is a block diagram illustrating a detailed configuration of the byte de-stuffing processor shown in FIG. 6, in accordance with the principles of the present invention.

FIG. 7 is a block diagram illustrating a detailed configuration of the byte stuffing processor shown in FIG. 6, in accordance with the principles of the present invention. FIG. 8 is a block diagram illustrating a detailed configuration of the byte de-stuffing processor shown in FIG. 6, in accordance with the principles of the present invention. FIG. 7 is a block diagram illustrating a detailed construction of the byte stuffing processor 635, and FIG. 8 is a block diagram illustrating a detailed construction of the byte de-stuffing processor 645.

Referring to FIG. 6, the frame received by the MAC 211 is inputted to the network controller 212 after a MAC header is eliminated from the frame. The network controller 212 receives the frame from which the MAC header has been eliminated, and analyzes an IP address from an IP header of the frame, thereby determining whether the IP address from the IP header of the frame coincides with the IP address of the network controller 212. When the IP address from the IP header of the frame coincides with the IP address of the network controller 212, the network controller 212 eliminates the IP header of the frame and then analyzes a GRE header of the frame without the IP header, thereby confirming a key value. Then, the network controller 212 finds a PPP session number corresponding to the confirmed key value, classifies a PPP frame, obtained by eliminating the GRE header from the frame, according to the PPP session number, and then provides the PPP frame to a packet memory 619. In this case, the packet memory 619 may store PPP link setting options according to the PPP session numbers. The PPP frame is converted into an IP frame by the IP frame generator 240, which is then stored in the packet memory 619. The network controller 212 reads the IP frame stored in the packet memory 619 and provides the IP frame to the router 111 through a bus. The IP frame having been provided to the router 111 is provided to a predetermined end host 115 through the Internet 113.

Meanwhile, an IP frame from the end host 115 is received by the router 111 through the Internet 113, and the router 111 provides the IP frame to the network controller 212 of the PDSN 210. The network controller 212 stores the IP frame from the router 111 in the packet memory 619. The IP frame stored in the packet memory 619 is converted into a PPP frame by the PPP frame generator 230, which is then stored in the packet memory 619. The network controller 212 adds a GRE header and an IP header to the PPP frame stored in the packet memory 619 and then provides the frame with the headers to the MAC 211. The MAC 211 adds an MAC header to the frame and then transmits it to the BSC/PCF 105.

As described above, the network controller 212 utilizes software in converting the frame provided by the MAC 211 into the PPP frame and storing the PPP frame. Also, the network controller 212 utilizes software in converting the PPP frame generated by the IP frame generator 240 into a frame which can be provided to the BSC/PCF 105.

A receiving (Rx) ring descriptor 611 and a transmitting (Tx) ring descriptor 612 are included in the packet memory 619. The packet memory 619 includes Rx and Tx ring descriptors 611 and 612 for stuffing, Rx and Tx ring descriptors 613 and 614 for de-stuffing, Rx and Tx PPP stuffing queues 615 and 616, and Rx and Tx PPP de-stuffing queues 617 and 618. The Rx and Tx PPP stuffing queues 615 and 616 are queues used in the PPP frame generator 230 to generate a PPP frame from an IP frame, and the Rx and Tx PPP de-stuffing queues 617 and 618 are queues used in the IP frame generator 240 to generate an IP frame from a PPP frame. The Rx and Tx PPP stuffing queues 615 and 616 and the Rx and Tx PPP de-stuffing queues 617 and 618 are shared by the network controller 212 in its process by software. That is, the network controller 212 stores a PPP frame, which is obtained by eliminating the GRE header and the IP header from the frame received from the MAC 211, in the Tx PPP de-stuffing queue 618, thereby enabling the IP frame generator 240 to read the PPP frame. Meanwhile, the IP frame generated by the IP frame generator 240 is stored in the Rx PPP de-stuffing queue 617, so that the network controller 212 can read the IP frame and transmits it to the router 111. Meanwhile, the IP frame provided to the network controller 212 from the router 111 is stored in the Tx PPP stuffing queue 616, so that the PPP frame generator 230 can read the IP frame. The PPP frame generated by the PPP frame generator 230 is stored in the Rx PPP stuffing queue 615, so that the network controller 212 can read the PPP frame and transmits the PPP frame to the BSC through the MAC 211. The Rx and Tx ring descriptors 611 and 612 reduce software load on the framing and stuffing of the PPP frame generator 230 for. generating the PPP frame. The Rx and Tx ring descriptors 613 and 614 reduce software load on the de-framing and de-stuffing of the IP frame generator 240 for generating the IP frame.

The PPP frame generator 230 includes a first peripheral connect interface (PCI) interface 631, a first direct memory access (DMA) controller 632, a first reception buffer 633, a first transmission buffer 634, and a byte stuffing processor 635.

The first PCI interface 631 has both master and slave functions and interfaces data received or transmitted through the bus. In this case, the bus may be a PCI bus which employs data transmission of 32 bits and 66 megahertz (MHz). The first DMA controller 632 performs data communication with the above-described configuration through the first PCI interface 631. That is, the first DMA controller 632 receives an IP frame, which which is to be framed and stuffed, through the first PCI interface 631 from the Tx PPP stuffing queue 616, and stores the IP frame in the first reception buffer 633. Further, the first DMA controller 632 reads a PPP frame, which has been framed and stuffed, from the first transmission buffer 634, and stores the PPP frame in the Rx PPP stuffing queue 615 through the first PCI interface 631. The first reception buffer 633 temporarily stores data provided from the first DMA controller 632 for framing and stuffing. The first reception buffer 633 may be a data width conversion First-in First-out (FIFO) buffer which has an input of 32 bits and an output of 8 bits. The byte stuffing processor 635 receives the IP frame stored in the first reception buffer 633 and converts data of the IP frame into a PPP frame. When stuffing of the converted PPP frame is required, the byte stuffing processor 635 performs stuffing of data recorded in an information field of the PPP frame and then stores the stuffed data in the first transmission buffer 634. In contrast, when stuffing of the converted PPP. frame is not required, the byte stuffing processor 635 stores the PPP frame intact in the first transmission buffer 634.

FIG. 7 illustrates a detailed construction of the byte stuffing processor 635. The first transmission buffer 634 receives and stores the PPP frame which has been framed and stuffed by the byte stuffing processor 635. The first transmission buffer 634 maybe a data width conversion FIFO buffer which has an input of 8 bits and an output of 32 bits.

The IP frame generator 240 includes a second PCI interface 641, a second DMA controller 642, a second transmission buffer 643, a second reception buffer 644, a byte de-stuffing processor 645, a buffer 647, a memory 648, a memory controller 649, an address generator 646, and a buffer controller 650. The second transmission buffer 643 and the second reception buffer 644 are simultaneously controlled by the second DMA controller 642 and the byte de-stuffing processor 645.

The second PCI interface 641 has both master and slave functions and interfaces data received or transmitted through the bus. In this case, the bus may be a PCI bus which employs data transmission of 32 bits and 66 MHz. The second DMA controller 642 performs data communication with the above-described configuration through the second PCI interface 641. That is, the second DMA controller 642 receives a PPP frame, which is to be de-framed and de-stuffed, through the second PCI interface 641 from the Tx PPP de-stuffing queue 618, and stores the PPP frame in the second reception buffer 644. Further, the second DMA controller 642 reads an IP frame, which has been de-framed and de-stuffed, from the second transmission buffer 643, and stores the IP frame in the Rx PPP de-stuffing queue 617 through the second PCI interface 641. The second reception buffer 644 temporarily stores data provided from the second DMA controller 642 for de-framing and de-stuffing. The second reception buffer 644 may be a data width conversion FIFO buffer which has an input of 32 bits and an output of 8 bits. The byte de-stuffing processor 645 receives the PPP frame stored in the second reception buffer 644 and converts data of the PPP frame into an IP frame. Before generating the IP frame, when de-stuffing of the PPP frame is required, the byte de-stuffing processor 645 performs de-stuffing of the stuffed data recorded in an information field of the PPP frame, thereby restoring the stuffed data to original data. Then, the byte de-stuffing processor 645 inserts the restored data into the original PPP frame, thereby generating an IP frame.

FIG. 8 illustrates a detailed construction of the byte de-stuffing processor 645. When the PPP frame has been fragmented into multiple PPP frame fragments, it is required that the IP frame generator 240 include a separate configuration for reassembling the PPP frame segments having the same session number to generate one IP packet. That is, the IP frame generator 240 additionally includes the memory 648, the memory controller 649, the address generator 646, and a buffer controller 650. The address generator 646 generates a predetermined address of the memory 648 corresponding to the PPP session number in order to store the data which have been de-framed and de-stuffed according to the PPP session. The buffer controller 650 controls buffering of the buffer 647 and the second transmission buffer 643 by means of the address generated by the address generator 646. The buffer 647 temporarily stores data of 8 bits inputted from the byte de-stuffing processor 645 and outputs data of 32 bits by the control of the buffer controller 650. The memory controller 649 receives the address generated by the address generator 646 and controls the memory 648 by the address. The memory 648 receives data buffered by the buffer 647 and stores the data by the control of the memory controller 649. Therefore, data outputted from the byte de-stuffing processor 645 are classified and stored according to the PPP session numbers in the memory 648. Meanwhile, the memory 648 outputs the stored data according to the PPP session numbers by the control of the memory controller 649. The second transmission buffer 643 temporarily stores data outputted from the memory 648 and provides the stored data to the second DMA controller 642 by the control of the buffer controller 650. The data provided to the second DMA controller 642 have a configuration of an IP frame which has already been de-framed and de-stuffed.

With reference to FIG. 7, the first DMA controller 632 sends a session start signal to a control data register 721 as soon as it starts to write data for PPP byte stuffing of a new PPP session to the first reception buffer 633.

When the control data register 721 receives the session start signal from the first DMA controller 632, the control data register 721 starts to receive control data of a fixed size from the first reception buffer 633. Further, the control data register 721 stores values of the received control data in corresponding registers. Meanwhile, the control data register 721 sends an ACCM flag value, which is a PPP session link option setting value received by the control data register 721 for byte stuffing, to a stuffing option comparator 723. Also, the control data register 721 counts control data having a fixed size for a header inserting unit 722. When the control data register 721 has received all of the control data, the control data register 721 allows itself to stay in a disable state and sends an enable signal to the header inserting unit 722, thereby causing '0x7E' to be inputted through an 8 bit bus to the first transmission buffer 634 which is a buffer for converting a length of data. Further, when the control data register 721 has received a signal from an end flag inserting unit 726, which represents that a PPP framing for one piece of PPP data has been completed, the control data register 721 receives a signal from the first reception buffer 633 again. In FIGS. 7 and 8, the dotted lines indicate control information, and the solid arrows indicate data flow.

As soon as the header inserting unit 722 receives the enable signal from the control data register 721, the header inserting unit 722 inserts a PPP frame header into the PPP frame data. Herein, fixed values of '0xFF' and '0x03' are inserted together with a start flag into the PPP frame data, which are then provided to the first transmission buffer 634. The fixed values of '0xFF' and '0x03' are inputted again to a cyclic redundancy check (CRC) inserting unit of a CRC calculation and inserting unit 725 for generating a CRC field value.

The stuffing option comparator 723 receives the ACCM flag value from the control data register 721 through an internal comparator in the stuffing option comparator 723 and compares the ACCM flag value with the real PPP data received by the first reception buffer 633. As a result of the comparison, bytes corresponding to the ACCM flag value are sent to a byte stuffer 724, are all byte-stuffed on the basis of Request for Comments (RFC) 1662, and are then inputted to the first transmission buffer 634. However, when the ACCM flag value is '0x00' which means no byte stuffing, the stuffing option comparator 723 does not perform the byte stuffing and sends the PPP frame data simultaneously to both the first transmission buffer 634 and the CRC calculation and inserting unit 725.

The byte stuffer 724, which is a portion actually performing the byte stuffing based on the Request for Comments (RFC) 1662, inserts '0x7D', which is a control escape character, before the data to be stuffed, and the original data are sent to the first transmission buffer 634 after the insertion.

The CRC calculation and inserting unit 725 is a unit performing CRC calculation for inserting a CRC field value and includes a CRC logic. All of the PPP data before being byte stuffed except for a start flag and an end flag of the PPP frame are inputted to the CRC calculation and inserting unit 725, in which the CRC of the data is then calculated. Further, the CRC calculation and inserting unit 725 receives a signal, which represents a final byte in byte stuffing in a PPP session being currently in progress, from the first DMA controller 632. The control data register 721, the header inserting unit 722, and the stuffing option comparator 723 prevent data for processing the next PPP session from being received from the first reception buffer 633. The CRC calculation and inserting unit 725 provides a value of 2 byte resulted from the CRC calculation to the first transmission buffer 634 after the stuffing option comparator 723 determines whether stuffing is necessary or not. Then, the CRC calculation and inserting unit 725 immediately sends an enable signal for the end flag to the end flag inserting unit 726.

The end flag inserting unit 726 sends '0x7E', which is an end flag, to the first transmission buffer 634, and sends a signal representing completion of PPP framing for the current session to the control data register 721, the first DMA controller 632, and a buffer controller (not shown), thereby enabling the first DMA controller 632 to take all of the PPP framing data for the current session in the first transmission buffer 634.

Next, the byte de-stuffing processor 645 will be described with reference to FIG. 8. Each block in the byte de-stuffing processor 645 is initially in a disable state, and the second DMA controller 642 stores control data for processing a new PPP session in a control data register 821 in the byte de-stuffing processor 645. The control data stored in the control data register have a size promised in advance, which enables a start point of pure PPP frame data to be understood, and the control data are sent to a start flag search and eliminating unit 822.

Meanwhile, the second DMA controller 642 refers to the Tx ring descriptor 614 in order to transmit the PPP frame data, which will be de-stuffed and include control data, in units of a predetermined size to the second reception buffer 644. The second reception buffer 644 outputs the data one byte by one byte by the control of the byte de-stuffing processor 645. From among the data outputted from the second reception buffer 644, the control data including a data size, a negotiation value for PPP link setting, etc., are inputted to and stored in a corresponding register of a control data register 821. After the control data having the predetermined size has been inputted, the control data register 821 outputs an enable signal to the start flag search and eliminating unit 822 for the process of a next step.

The start flag search and eliminating unit 822 searches for and eliminates the start flag. Herein, '0x7E', '0xFF', and '0x03' are sequentially inputted, which represent values of a start flag, and fixed address field and control field of the PPP frame format after the control data are inputted, respectively. When the start flag is detected, the start flag search and eliminating unit 822 eliminates the start flag '0x7E' and directly sends the fixed values '0xFF' and '0x03' following the start flag to a CRC check and comparison unit 826 and not to the output buffer (not shown in FIG. 8) for the CRC calculation. When the start flag is not detected, the start flag search and eliminating unit 822 transfers the inputted data to an end flag search and eliminating unit 823 and then outputs an enable signal.

When an end flag is found through a search for the end flag, the end flag search and eliminating unit 823 eliminates the end flag. However, when the end flag is not found, the end flag search and eliminating unit 823 transfers the data provided from the start flag search and eliminating unit 822 to a byte stuffing search unit 824. When the end flag is detected after the byte stuffing search unit 824 and a byte de-stuffer 825 perform de-stuffing, the end flag search and eliminating unit 823 eliminates the end flag. Further, the end flag search and eliminating unit 823 reports the detection of the end flag to the control data register 821. When a next session for processing new PPP frame data is inputted to the control data register 821 in a state in which the control data register 821 has not received an end flag detection signal, the control data register 821 compares the current session number with the previous session number to determine whether the session numbers are equal to each other or not. When the session numbers are different from each other, a fragment flag is set in a fragment flag register of a corresponding session number. Thereafter, the control data register outputs the PPP data remaining in the buffer to the memory 648 under the control of the address generator 646 using the PPP session numbers and address displacement from a start address. During the above process, if a PPP session number for processing new PPP frame data, which is equal to the previous session number, is inputted although the end flag has not been received, it means that the new PPP frame data have a size larger than a length of a GRE tunnel and contains no end flag. Therefore, even when fragmented data are inputted, the control data register does not set the fragment flag register, and the byte de-stuffer 825 sets the fragment flag register only when PPP sessions different from each other are continuously processed. Further, when the end flag search and eliminating unit 823 has detected an end flag, the end flag search and eliminating unit 823 reports reception of the end flag to a buffer 828 of 2 byte, so that a value of the output buffer storing a CRC value of 2 byte just before the end flag from among the PPP frame data can be transmitted to the CRC check and comparison unit 826. Further, when an end flag has been detected but a new PPP session has not been processed by the control data register 821, at least one pair of start and end flags exist in data processed in the same session, so that the end flag search and eliminating unit 823 sends an operation enable signal to the start flag search and eliminating unit 822 again.

The byte stuffing search unit 824, which is a unit for performing byte de-stuffing for the data inputted in a unit of byte on the basis of Request for Comments (RFC) 1662, analyzes the ACCM value stored in the control data register 821 to determine if a corresponding session requires byte stuffing or not. As a result of the analysis, when byte stuffing is unnecessary, the byte stuffing search unit 824 does not send PPP frame data of the corresponding session to the byte de-stuffer 825 but directly send the PPP frame data of the corresponding session only to the buffer 647. Further, when a value of the ACCM flag is not 0×0 (no byte stuffing), the byte stuffing search unit 824 finds and eliminates '0x7D', which is a control escape character, on the basis of RFC 1662, and sends byte data following the ACCM flag to the byte de-stuffer 825. However, when '0x7D' is not found, the data are sent to the buffer 647. Further, the end flag search and eliminating unit 823, which is the last one of the elements connected in a daisy chain method, sends an operation enable signal to the start flag search and eliminating unit 822 after the de-stuffing.

The byte de-stuffer 825 eliminates '0x7D', which is a control escape character, from byte data received by the byte stuffing search unit 824, and restores the stuffed data to original byte data by performing real byte de-stuffing for the byte data according to RFC-1662.

The CRC check and comparison unit 826 internally converts the byte data received from the byte stuffing search unit 824 into bit data and inputs the bit data into a CRC detecting logic, thereby performing CRC examination. An intermediate CRC calculation value is always stored in a separate CRC intermediate calculation value register 832, and thus the control data register 821 sends a signal representing data input for processing a new PPP session to the CRC check and comparison unit 826. In this case, a currently incomplete CRC calculation value stored in the CRC intermediate calculation value register 832 is sent to the buffer 828. Thereafter, the buffer 828 transmits the value through a data bus of 8 bits to the buffer 647.

Further, when an end flag is detected in one PPP session process, a CRC value of 2 byte in the buffer 828 is inputted to the CRC check and comparison unit 826. Then, the CRC check and comparison unit 826 compares the CRC value with a value resulted from CRC calculation for the PPP frame data received from the byte stuffing search unit 824 and the byte de-stuffer 825, thereby judging whether CRC eliminated data are normal or not. Further, the judged result is inputted to a specific address of a control data area in the memory by the address generator 646 and the memory controller 649.

The buffer 828 of 2 byte is nominally used in temporarily storing byte data which have been either de-stuffed or inputted intact, but is actually used in extracting a CRC field value of 2 byte just before an end flag after the end flag is detected and then sending the CRC field value to the CRC check and comparison unit 826. The buffer 828 inputs values having performed the pure PPP de-framing (elimination of 0x7E, 0xFF, and 0x03, and byte de-stuffing) together with the ACCM flag value and the PPP session number of the control data register 821 to a data length conversion buffer. In this case, the inputted values are addressed to a specific address of the memory corresponding to each PPP session by the address generator 646 and the memory controller 649. Herein, the data are inputted to the memory controller 649 by the control of the buffer controller 650 to which data output count number of the address generator 646 and the buffer 828 is inputted.

When the same and new PPP session processing data are inputted in a state in which they are set in a fragment flag register of the control data register 821, the control data temporary register reads the incomplete CRC value stored just now in a place in the memory, in which control data of a corresponding fragmented PPP session are stored. Then, the control data temporary register sends the incomplete CRC value to the CRC check and comparison unit 826 to complete the CRC examination for one entire PPP frame, and then stores normality or abnormality of the PPP frame in a specific control data area in the memory. Further, in order to transmit data from the memory to the second transmission buffer 643, when the end flag search and eliminating unit 823 detects an end flag, the end flag search and eliminating unit 823 immediately sends a signal to the control data register 821 and the address generator 646. The address generator 646 sends pure PPP data out of the memory according to the addresses counted in sequence from a base address of the corresponding PPP session.

From among blocks of the byte de-stuffing processor 645 described above, the control data register 821, the start flag search and eliminating unit 822, and the end flag search and eliminating unit 823, which share an input data bus, employ a daisy chain method, in which a next block can be processed only after a current block is completely processed.

Hereinafter, transmission/reception of packet data according to an embodiment of the present invention will be described in detail with reference to accompanying drawings.

2. Operation According to the Present Invention 2.1 Initialization

As described above, in order to transmit packet data between the MS 101 and the Internet 113, predetermined protocol and information for routing are used, definition of which will be described hereinafter before real transmission of packet data will be described.

In order to transmit packet data through the configuration shown in FIG. 1, various procedures for initializing each element of the configuration are necessary. That is, protocols, communication routes, etc., which are required in packet communication, must be set before packet data are actually transmitted. That is, the procedures for initialization include a step of understanding the kind of a call in progress, a step of judging whether connection in a system must be permitted or not according to the understood kind of the call, and the like. These procedures are performed by communication systems having subscribers, and the communication systems have different procedures according to connection methods of the systems. This is because the systems have different configurations and use different protocols.

In the following description, the term "R-P" is an abbreviation for Radio Network—Packet Data Serving Node. An R-P session layer is a Radio Network—PDSN session layer. An R-P interface is a Radio Network—PDSN interface. Radio Network can be abbreviated as RN.

In a more detailed description, an R-P session layer exists between the BSC/PCF 105 and the PDSN 109. An R-P interface for the R-P session layer is used even between a PDSN 109 and a BSC/PCF 105 in a mobile packet data communication system, in order to transmit packet data. That is, the BSC/PCF 105 and the PDSN 109 are interconnected in a way to allow packet data to be transmitted and received by means of the R-P interface between them. Further, the PDSN 109 and the IP Network 107 are interconnected in a way to allow packet data to be transmitted between them. This connection requires a signaling for connection setup between the PDSN 109 and the IP Network 107, in which an A11-Registration message is exchanged in a form of MAC/IP/UDP/Mobile IP (All Registration-Request & Reply). The message in the form described above is inputted through a Network Processor (NP) of an interface line card of the PDSN 109 to a system processor and is then processed in order to open the R-P session between the BSC/PCF 105 and the PDSN 109.

After the R-P session between the BSC/PCF 105 and the PDSN 109 is opened through the above process, a PPP session between the MS 101 and the PDSN 109 is opened. Meanwhile, in order to negotiate a PPP link configuration between the BSC/PCF 105 and the PDSN 109, a configuration option is set up through a link control protocol (LCP) step of the PPP. That is, the PDSN 109 sends "LCP Configure-Request", which is a message for a new PPP session, to the MS 101. In this case, a Maximum Transmit Unit (MTU) of the PPP link promised between the MS 101 and the PDSN 109, PAP/CHAP (Password Authentication Protocol/Challenge Handshake Authentication Protocol), PPP protocol compression, ACFC (Address/Control Field Compression), self padding, etc., maybe negotiated through the LCP option. Further, the MS 101 and the PDSN 109 use a HDLC-like PPP framing method of Request for Comments (RFC) 1662 in order to transmit packet data by PPP to each other.

When the setup of the PPP session between the MS 101 and the PDSN 109 has been completed through the above-described process, the MS 101 and the PDSN 109 reach a complete transmission state in which they communicate with each other by means of their IPs. In the complete transmission state, an IP (0×21) is included in the protocol field of the PPP data link, and an IP data program is sent to an information field of the PPP data link. Therefore, the PPP link between the MS 101 and the PDSN 109 enters a complete setup state for sending an IP over PPP.

In the following description about a series of procedures for transmitting packet data to an Internet network according to an embodiment of the present invention, it is assumed that a predetermined initialization has been already performed. The initialization implies setup of the PPP connection, IP connection, and GRE tunneling for transmission of packet data between the MS 101 and the PDSN 109.

2.2 Transmission of Packet Data from Terminal

When the predetermined initialization described above has prepared a state in which packet data transmission is possible, data having been transmitted through an air link from the MS 101 are converted into data having a configuration of MAC/IP/GRE/PPP/IP/Higher Layer while passing through the BTS 103 and the BSC/PCF 105, and the converted data are then inputted to the PDSN 109. FIG. 4 shows a frame structure of the data inputted to the PDSN 109.

While the inputted data pass through the MAC 211, the MAC header is eliminated from the data. The IP packet data from which the MAC header has been eliminated are inputted to the network controller 212. The network controller 212 determines whether the IP packet data has an IP address coinciding with its own IP address or not by means of the IP header of the IP packet data. When the IP packet data have an IP address coinciding with its own IP address, the network controller 212 eliminates the IP header and then analyzes a GRE header of the IP packet data without the IP header. Through the analysis of the GRE header, the network controller 212 finds a key value and a sequence number. The network controller 212 manages the sequence number and finds a PPP session number activated by the key value. After finding the PPP session number, the network controller 212 stores the PPP frame without the GRE header in a specific area of the temporary packet memory 213 for de-framing and de-stuffing the PPP frame. The de-framing is performed when the PPP frame has been fragmented, and the de-stuffing is performed when data recorded in the information field of the PPP frame other than the headers thereof has been stuffed. The specific area of the temporary packet memory 213 in which the PPP frame is stored is the Tx PPP de-stuffing queue 618 shown in FIG. 6. In this case, options negotiated when the PPP link is set together with the PPP frame data to be de-framed and de-stuffed are stored in the network controller 212 according to the PPP session numbers previously found. The second DMA controller 642 accesses the Tx PPP de-stuffing queue 618 and reads the PPP frame data and options corresponding to the PPP frame data. The PPP frame data read by the second DMA controller 642 are transmitted by a bus such as a PCI bus and transferred to the second DMA controller 642 through the second PCI interface 641. Herein, the second DMA controller 642 refers to the Tx ring descriptor 614 in order to read desired PPP frame data from the Tx PPP de-stuffing queue 618. The Tx ring descriptor 614 has all information which is necessary in DMA data transmission between the Tx PPP de-stuffing queue 618 and the byte de-stuffing processor 645.

The second DMA controller 642 records the PPP frame data read from the Tx PPP de-stuffing queue 618 in the second reception buffer 644. For example, the second DMA controller 642 burst-reads 64 bytes of the PPP frame data each time into the second reception buffer 644 through a PCI bus employing 32 bit and 66 MHz. At the second reception buffer 644, a data width conversion FIFO having an input of 32 bits and an output of 8 bits is employed.

As described above, when the PPP frame data are recorded in a unit of a predetermined size in the second reception buffer 644, the second DMA controller 642 may report a start point of a PPP session, which represents a new frame data, to the byte de-stuffing processor 645. Further, since the second DMA controller 642 refers to the Tx ring descriptor 614 when it brings data from the Tx PPP de-stuffing queue 618, when the size of pure PPP data corresponding to a portion of the entire data except for control data has been understood, the start point and end point can be understood. The size of the control data included in the Tx PPP de-stuffing queue 618 is limited to a size promised in advance between a software and the IP frame generator 240.

The byte de-stuffing processor 645 requires predetermined pieces of option information in order to perform the de-framing and de-stuffing. For this, the Tx PPP de-stuffing queue 618 includes control data according to PPP frame data units in one GRE tunnel, when frame data to be de-framed are stored in the Tx PPP de-stuffing queue 618. The control data are options negotiated in the step of setting the PPP link between the MS and the PDSN. When the PPP frame in the GRE tunnel is not fragmented, the PPP frame therein has one start flag and one end flag. In contrast, when the PPP frame has been fragmented, either one start flag and one end flag may exist or multiple start and end flags of multiple PPP frame may be mixed with each other. In the latter case, in order to perform de-framing and de-stuffing for one complete PPP frame, a following PPP frame having the same GRE key number must be de-framed and then attached to PPP data previously de-framed. In order to de-stuff the fragmented PPP frames, PPP data previously de-framed and de-stuffed must be temporarily stored. Further, when a next PPP frame having the same GRE number is inputted, the control data stored in the memory 648 are brought to the byte de-stuffing processor 645, and the next PPP frame is de-stuffed according to a CRC value previously unconfirmed and an ACCM flag value previously negotiated, is attached to PPP data previously stored in the memory, and is then stored. Thereafter, when the PPP data stored in the memory 648 have been processed up to the end flag by the byte de-stuffing processor 645, one piece of PPP data is stored in the second transmission buffer 643.

When an end flag is detected in a state where no new PPP session has been inputted while the second DMA controller 642 performs de-stuffing by recording the PPP frame data with a predetermined size in the second reception buffer 644, the control data register 821 in FIG. 8 is enabled again to check whether a new start flag is inputted. That is, this process is performed when the PPP frame data transmitted to the second reception buffer 644 have more than one start flag.

Further, when the start flag and the end flag of the one frame do not pair with each other and a signal informing byte de-stuffing of a new PPP session is received from the second DMA controller 642 without an end flag (when the end flag exists in a next fragmented PPP frame data in the GRE tunnel), the control data register 821 judges whether the currently received PPP session is equal to the previous PPP session or not. When a PPP session different from the previous PPP session has been inputted, an intermediate CRC calculation value calculated up to now by the CRC check and comparison unit 826 is inputted through a buffer to the memory. In this case, the intermediate CRC calculation value is stored in a fixed CRC storage position in an address based on a PPP session of the control data register 821.

However, when anew PPP session process data are inputted for processing the remaining PPP frame data, the control data register 821 sets a flag in a separate register representing fragment information according to PPP sessions. Further, the intermediate CRC calculation value which is stored in the memory and calculated in the previous de-stuffing is loaded on a separate intermediate CRC register and is thus brought to the CRC check and comparison unit 826, so that the CRC examination is continuously performed. Thereafter, when the end flag search and eliminating unit 823 detects an end flag, a resultant CRC value of the CRC check and comparison unit 826 is compared with a value obtained by bringing 2 byte of CRC before the end flag of the PPP frame to the CRC check and comparison unit 826 from the buffer, so that whether the CRC value is normal or abnormal is determined. In this case, the stored control data in the memory include information representing the normality or abnormality of the CRC value.

In the above description, a separate flag register having all information about fragmented flags according to sessions exists in the control data register 821, and the fragmented flags separately exist in the control data register 821.

As described above, in the present invention, a double data rate synchronous dynamic random access memory (DDR SDRAM) is used as the memory 648 for temporarily storing the PPP data which have been incompletely processed due to the fragmented PPP frame data. Meanwhile, the PPP data processed in the byte de-stuffing processor 645 according to the PPP session number included in the PPP control data received from the Tx ring descriptor 614 are stored in the memory 648. Herein, since the MS and the PDSN are in communication with each other, there exist a plurality of session numbers, and thus the memory 648 must have a large capacity capable of processing as many PPP frame data as the number of the PPP sessions.

Further, since the fragmented PPP frame data are stored in the memory 648, when the address generator 646 obtains a PPP session number by analyzing the PPP control data from the byte de-stuffing processor 645, the address generator 646 calculates an address to be stored in the memory 648 by means of a hardware logic on the basis of the PPP session number. This address is directly connected to the memory controller 649. Further, when a DDR SDRAM is employed as the memory 648, since the byte de-stuffing processor 645 processes data in a unit of 8 bits while 32 bit data must be inputted to and outputted from the memory 648, the buffer 647 for converting the data width is interposed between the byte de-stuffing processor 645 and the memory 648 in order to store the data from the byte de-stuffing processor 645 in the memory 648. In this case, the buffer 647 must have a configuration capable of receiving 8 bit data and outputting 32 bit data.

The second DMA controller 642 reads the de-framed and de-stuffed data stored in the second transmission buffer 643 and transfers the read data to the second PCI interface 641, and then the second PCI interface 641 records the data in the Rx PPP de-stuffing queue 617 through the bus. In this case, the second DMA controller 642 records information in relation to transmission of the Rx ring descriptor 613 when recording the data in the Rx PPP de-stuffing queue 617.

Hereinafter, de-framing and de-stuffing for the PPP frame data will be described in detail with reference to FIG. 8.

The fragmented PPP frame data of 32 bits to be de-framed and de-stuffed are inputted to the second reception buffer 644 through DMA transmission. In this case, control data including a PPP session number and an option of a PPP link for the PPP frame are inputted together with the fragmented PPP frame data and are then stored in a separate control data register. The byte de-stuffing processor 645 using field programmable gate array (FPGA) can be classified into configurative elements according to steps for performing the de-framing and the de-stuffing. The configurative elements according to steps employ a daisy chain method in which a process by a next configurative element can be performed only after a process by a previous configurative element is completely performed. Further, the second reception buffer 644 is controlled to output the PPP frame data after recognizing an enable state of each configurative element. Further, there exists a separate configurative element for CRC check. When a start flag is found, all frame data are inputted to the configurative element for CRC check until an end flag is found. Then, whether the CRC is normal or not is determined, and then the determined result is included PPP control data and reported to the network controller 212.

Referring to FIG. 8, the control data register 821 receives an end flag from the byte de-stuffer 825 and then compares a PPP session number inputted thereafter with a current PPP session number. When the two numbers are different from each other, the control data register 821 sets bits representing that the inputted data are fragmented PPP data in the control data. In this case, the buffer 647 is controlled to allow all of the PPP data accumulated in the buffer 647 to be stored in the memory 648.

When the process by the control data register 821 has been completed, the start flag search and eliminating unit 822 finds and eliminates a start flag '0x7E' from the PPP frame data of 8 bits inputted from the second reception buffer 644. Then, the start flag search and eliminating unit 822 outputs an enable signal for enabling the next configuration, the end flag search and eliminating unit 823.

The end flag search and eliminating unit 823 is enabled by the enable signal, and then finds and eliminates '0xFF', a fixed address field value, and '0x03', a control field value, from the PPP header of the PPP frame data. However, the eliminated values are provided to the CRC check and comparison unit 826, since they are necessary in CRC check. Further, the end flag search and eliminating unit 823 examines whether a byte stuffed value exists or not in the PPP information field excepting the PPP header. When the PPP field includes '0x7D' which is a control escape character, it is concluded that a byte stuffed value exists in the PPP information field. If no control escape character is found in the PPP information field, all the PPP data up to the end flag are transferred to the CRC eliminating unit 828 through an output bus of 8 bits. Further, when an end flag is found in the byte de-stuffer 825, bits representing the CRC value is normal are set in PPP control data stored in addresses placed within a certain displacement from a start address determined according to each PPP session number, thereby reporting that corresponding PPP frame data are normal.

When '0x7D' is found by the end flag search and eliminating unit 823, the byte stuffing search unit 824 eliminates '0x7D', and then performs de-stuffing on the basis of RFC 1662. When an end flag is not found by the byte de-stuffer 825, the PPP data are transmitted through the CRC eliminating unit 828 to a bus having an 8 bit output. Further, the CRC eliminated by the CRC eliminating unit 828 is inputted to the CRC check and comparison unit 826 for CRC checking. The byte de-stuffer 825 examines whether data de-stuffed by the byte stuffing search unit 824 has the end flag or not. When the data has the end flag, the end flag is eliminated. Meanwhile, when the end flag is detected, the byte de-stuffer 825 reports the detection of the end flag to the CRC check and comparison unit 826.

The CRC check and comparison unit 826, which is a configuration for CRC check, is always in an enable state after existence of a start flag is detected. When the detection of the end flag is reported from the byte de-stuffer 825, the CRC check and comparison unit 826 checks CRC values up to then. As a result of the checking, when the CRC value is normal, a CRC field value, which is the final data of the frame in the CRC eliminating unit 828, is eliminated, an input state of the CRC eliminating unit 828 is disabled. Further, when fragmented PPP framing data are inputted, they are de-framed and are then stored in the memory 648 according to corresponding PPP session numbers. Thereafter, when PPP framing data having the same PPP session number are inputted, the PPP framing data are de-framed and are then attached to PPP data stored in advance in the temporary storage memory 648 according to the PPP session numbers. Further, when the fragmented PPP framing data are inputted, the previously calculated CRC value is transferred from the memory 648 having control data to the CRC check and comparison unit 826 so as to complete the previously incomplete CRC check.

The buffer 647 for converting 8 bit data into 32 bit data is employed in order to store output data of 8 bits in the de-framing process by each configuration described above. That is, the de-framed data of 8 bits are filled in the buffer 647 until the de-framed data become 32 bits, and then the 32 bit data are simultaneously stored in the memory 648. In this case, the storage of the data into the memory 648 is controlled by the memory controller 649. That is, the address generator 646 receives a PPP session number corresponding to the data provided by the control data register 821 and generates an address corresponding to the PPP session number. The generated address is provided to the memory controller 649, and the memory controller 649 controls the 32 bit data outputted from the buffer 647 to be stored in the memory 648 by means of the generated address. Therefore, the data outputted from the buffer 647 are inputted to addresses determined in advance according to the PPP session numbers.

As described above, the address generator 646 generates a specific address for each PPP session, thereby enabling fragmented PPP frame data having the same PPP session number to be s stored in the same area of the memory 648.

In performing the de-framing, when no end flag is detected from a key value in one GRE or a different session number is provided from the second reception buffer 644, it means that the data previously stored in the memory 648 are fragmented PPP frame data. Further, even when '0x7E', a start flag, is not found after the PPP control data are inputted, it means that the data previously stored in the memory 648 are fragmented PPP frame data. In this case, the memory 648 provides the previously negotiated ACCM flag value and the previous CRC check result value to the control data register 821 and the CRC check and comparison unit 826 through a register 830. Therefore, following PPP control data having the same PPP session number as the currently received PPP session number can be completely de-framed and de-stuffed.

2.3 Reception of Packet Data to Terminal

In a state wherein transmission of packet data is made possible by the predetermined initialization described above, an IP packet data from the end host 115 is provided to the router 111 through the Internet 113 by the request from the MS 101. The router 111 transfers the IP packet data to the PDSN 109. The PDSN 109 performs framing and stuffing corresponding to the IP packet data, thereby generating a PPP packet data required by the MS 101, and then transfers the generated PPP packet data to the BSC/PCF 105.

The data inputted from the router 111 are stored in the Tx PPP stuffing queue 616 by the network controller 212. The first DMA controller 632 constituting the PPP frame generator 230 accesses the Tx PPP stuffing queue 616 and reads desired data and information necessary in order to perform framing and stuffing for the data. The data read by the first DMA controller 632 are transmitted to a bus (e.g. a PCI bus) and are then transferred through the first PCI interface 631 to the first DMA controller 632. In this case, the first DMA controller 632 refers to the Tx ring descriptor 612 in order to read desired data from the Tx PPP stuffing queue 616. The Tx ring descriptor 612 has all information necessary in DMA data transmission between the Tx PPP stuffing queue 616 and the byte stuffing processor 635. The first DMA controller 632 records the data read from the Tx PPP stuffing queue 616 in the first reception buffer 633. For example, the first DMA controller 632 burst-reads 64 bytes of the data each time into the first reception buffer 633 through a PCI bus employing 32 bits and 66 MHz, and a data width conversion FIFO, which receives 32 bit data and outputs 8 bit data, is employed as the first reception buffer 633.

Predetermined pieces of option information are necessary in order to enable the byte stuffing processor 635 to perform framing and stuffing. Therefore, when the Tx PPP stuffing queue 616 stores frame data to be framed, corresponding control data are included in the frame data. The control data are options negotiated in the step of setting the PPP link between the MS and the PDSN. If use of de-framing has been promised in the negotiated option, the byte stuffing processor 635 fragments the data to be transmitted, thereby generating multiple pieces of PPP frame data. Further, if use of de-stuffing has been promised in the negotiated option, the byte stuffing processor 635 performs the stuffing only for data recorded in a predetermined area of an information field excepting a PPP header from among the PPP frame data to be transmitted. Meanwhile, after the PPP frame data are framed and stuffed by the byte stuffing processor 635, the framed and stuffed data are not stored in a separate memory but are directly stacked in the first transmission buffer 634. The PPP frame data stacked in the first transmission buffer 634 are read by the first DMA controller 632 and are then provided to the first PCI interface 631. The PPP frame data provided to the first PCI interface 631 are transferred to the Rx PPP stuffing queue 615 through a predetermined bus.

The network controller 212 adds predetermined GRE header and IP header to the PPP frame data stored in the Rx PPP stuffing queue 615 and then provides the data having the GRE and IP headers to the MAC 211. The MAC 211 adds an MAC header to the data from the network controller 212 and then transfers the data having the MAC header to the BSC/PCF 105.

Hereinafter, framing and stuffing for the PPP frame data will be described in detail with reference to FIG. 7. The configurative elements shown in FIG. 7 also employ a daisy chain method in which a process by a next configurative element can be performed only after a process by a previous configurative element is completed. Further, the first reception buffer 633 must be controlled to output data after recognizing an enable state of each configurative element.

When the network controller 212 stores IP packet data to be framed and stuffed together with control data in the Tx PPP stuffing queue 616, the first DMA controller 632 brings the IP packet data with the control data and stores them in the first reception buffer 633. The PPP control data for the framing and stuffing include information about the size of the PPP frame data, which enables a start flag and an end flag to be easily inserted in the PPP control data. Meanwhile, the first reception buffer 633 must be controlled to output the stored PPP data after recognizing an enable state of each configurative element.

The control data register 721 receives the PPP control data from the first reception buffer 633, provides a negotiated ACCM flag value from among the PPP link options to the stuffing option comparator 723 by means of the PPP control data, and then transfers the value through a bus having an 8 bit output to the first transmission buffer 634. Meanwhile, the PPP control data from the first reception buffer 633, which have a fixed size, are inputted to the header inserting unit 722, and the header inserting unit 722 inserts a start flag into a predetermined position of the PPP control data and then transfers the PPP control data having the start flag to the first transmission buffer 634. The ACCM flag value provided from the control data register 721 is converted to one byte value of American Standard Code for Information Interchange (ASCII) Control Character, and the converted one byte value is set in the internal register. Meanwhile, the stuffing option comparator 723 compares the PPP data provided from the first reception buffer 633 with the setup ASCII value until an end flag is generated. As a result of the comparison, the stuffing option comparator 723 transfers some PPP data, which have the same value as the setup ASCII value, to the byte stuffer 724 for the byte stuffing. In contrast, the stuffing option comparator 723 transfers the other PPP data, which do not have the same value as the setup ASCII value, to both the first transmission buffer 634 and the CRC calculation and inserting unit 725 for CRC calculation. Meanwhile, the stuffing option comparator 723 recognizes by the end flag inserting unit 726 that the framing and stuffing of the PPP data have been completed, and then determines whether to perform the stuffing or not before inserting a calculated CRC value in a Frame Check Sequence (FCS) field of the PPP frame. That is, as a result of a comparison between the calculated CRC value and the ACCM flag value, when the two values are different from each other, the stuffing option comparator 723 concludes that the PPP data are not the data to be stuffed and then transfers the PPP data to the first transmission buffer 634. In contrast, when the two values are equal to each other, the stuffing option comparator 723 concludes that the PPP data are the data to be stuffed and then transfers the PPP data to the byte stuffer 724. The byte stuffer 724 performs stuffing for the PPP frame by a method clarified in Request for Comments (RFC) 1662. That is, the byte stuffer 724 performs stuffing for bytes flagged to ACCM from among the data constituting the PPP frame, and then transfers the stuffed bytes to both the first transmission buffer 634 and the CRC calculation and inserting unit 725 for CRC calculation. The CRC calculation and inserting unit 725 stores a resultant value of the CRC calculation for the PPP data in a separate register and refers to the number of pieces of the PPP data included in the PPP control data from the first reception buffer 633. When input of the PPP data is ended, the CRC calculation and inserting unit 725 transfers the final CRC calculation value up to then to the stuffing option comparator 723 in order to determine whether to perform the byte stuffing or not. The end flag inserting unit 726 stores the final value in the CRC register. Further, a CRC value is outputted from the byte comparator 723 and the byte stuffer 724, and simultaneously the end flag is transferred to the first transmission buffer 634.

When PPP framing data of a transmissible size is accumulated in the first transmission buffer 634 according to the stuffing by each of the configurations as described above, the first transmission buffer 634 transmits a DMA request signal to the first DMA controller 632. Then, the first DMA controller 632 reads the PPP framing data accumulated in the first transmission buffer 634 and transfers the PPP framing data to the Rx PPP stuffing queue 615, thereby enabling the PPP framing data to be stored in the Rx PPP stuffing queue 615. The PPP framing data stored in the Rx PPP stuffing queue 615 are subjected to GRE encapsulation by the software of the network controller 212 and are then transferred to the BSC/PCF 105.

As described above, the present invention realizes hardware to perfom PPP framing/stuffing and de-framing/de-stuffing in a Packet Data Serving Node (PDSN), thereby improving processing speed of a line card interfacing with a BTS. Therefore, not only the system performance of the entire PDSN is improved, but also problems due to data processing are prevented from being caused, since many functions in relation to PPP have been realized by hardware.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit and scope of the applicant's general inventive concept.

What is claimed is:

1. A deframing method, comprising:

receiving PPP frame data corresponding to a session number, storing, by a network controller, the PPP frame data in a packet memory in dependence upon the session number, and storing reassembling information corresponding to the session number, the PPP frame data being data conforming to a point-to-point protocol and being fragmented; and when said receiving has been completed, reading, by an IP frame generator, the PPP frame data from the packet memory and reassembling the read PPP frame data into one integrated piece of IP packet data, said reassembling being performed in dependence upon the reassembling information, the IP packet data being data conforming to the internet protocol, with the IP frame generator and the network controller being included in a packet data serving node (PDSN) in a mobile communication system, the mobile communication system comprising a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on the point-to-point protocol, the packet data serving node further comprising a PPP frame generator for converting the IP packet data received from the host into a plurality of pieces of PPP frame data, with the PPP frame generator and the IP frame generator being hardware modules separate from each other, the mobile communication system converting PPP frame data received from the base transceiver station into IP packet data and transferring the IP packet data to the host, the IP packet data conforming to the Internet protocol.

2. The deframing method of claim 1, further comprising: storing de-stuffing information in the packet memory; and de-stuffing the PPP frame data, said storing of the de-stuffing information being performed by the network controller, said de-stuffing being performed by the IP frame generator.

3. A deframing method, comprising:

receiving PPP frame data corresponding to a session number, storing the PPP frame data reassembling information, and de-stuffing information corresponding to the session number in a packet memory, said storing of the PPP frame data, the reassembling information and de-stuffing information being performed by a network controller, the PPP frame data being data conforming to a point-to-point protocol and being fragment; and when said receiving has been completed, reading the PPP frame data, reassembling information and de-stuffing information, each corresponding to the session number, from the packet memory;

when stuffed data have been recorded in an information field of the PPP frame data, performing byte de-stuffing for the stuffed data in dependence upon the read de-stuffing information; and reassembling the read PPP frame data into integration piece of IP packet data, said reading, de-stuffing and reassembling being preformed by an IP frame generator, said reassembling being performed in dependence upon the reassembling information, the IP packet data being data conforming to the point-to-point protocol, the IP frame generator and network controller being included in a packet data serving node in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on the point-to-point protocol, the mobile communication system converting PPP frame data received from the base transceiver station into IP packet data and transferring the IP packet data to the host, the IP packet data conforming to the Internet protocol, with said byte de-stuffing further comprising:

detecting whether a start flag is in the PPP frame data, and eliminating any start flag detected in the PPP frame data;

detecting whether an end flag is in the PPP frame data and eliminating any end flag detected in the PPP frame data, the session number corresponding to a first session number;

receiving a second session number distinguishable from the first session number, and, when the second session number is received in a state in which the end flag has been detected, reporting that reception of all of the PPP frame data corresponding to the first session number has been completed;

when at least one selected from among the start flag and the end flag has been eliminated, detecting whether the data recorded in the information field of the PPP frame data has been stuffed;

when the data recorded in the information field of the PPP frame data has not been stuffed, outputting the data recorded in the information field; and when the data recorded in the information field of the PPP frame data has been stuffed, performing de-stuffing for the data recorded on the information field and then outputting the de-stuffed data.

4. The deframing method of claim 3, with said reassembling of the PPP frame data comprising:

inputting the session number corresponding to the PPP frame data to generate a memory address corresponding to the session number;

temporarily storing the byte de-stuffed PPP frame data in accordance with the generated memory address; and when reception of all of the PPP frame data corresponding to the session number has been completed, outputting the one integrated piece of IP packet data formed of the PPP frame data stored according to the memory address.

5. A deframing method of claim 4, further comprising:
detecting whether the PPP frame data is normal in dependence upon cyclic redundancy check information corresponding to the PPP frame data, the cyclic redundancy check information being obtained after said detecting of whether the end flag is in the PPP frame data.

6. A deframing apparatus, comprising:
a packet data serving node (PDSN) in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on a point-to-point protocol, the mobile communication system converting PPP frame data received from the base transceiver station into IP packet data and transferring the IP packet data to the host, the PPP frame data conforming to a point-to-point protocol and being fragmented, the IP packet data conforming to an Internet protocol, the PPP frame data corresponding to a session number, said packet data serving node comprising:
a network controller receiving the PPP frame data and outputting the PPP frame data together with reassembling information in dependence upon the session number corresponding to the PPP frame data, the reassembling information having been negotiated when a point-to-point protocol link between the base transceiver station and said network controller is set;
a packet memory being in communication with said network controller, said packet memory storing the PPP frame data and the reassembling information received from the network controller in dependence upon the session number corresponding to the PPP frame data; and
a IP frame generator being in communication with the network controller, said IP frame generator reading the PPP frame data corresponding to the session number and reading the reassembling information from the packet memory and reassembling the read PPP frame data according to the reassembling information when reception of all PPP frame data corresponding to the session number has been completed, to generate one integrated piece of IP packet data, the IP packet data being data conforming to the Internet protocol; and
a PPP frame generator being in communication with the network controller and converting the IP packet data received from the host into a plurality of pieces of PPP frame data, with the PPP frame generator and the IP frame generator being hardware modules separate from each other.

7. The deframing apparatus of claim 6, with said IP frame generator reading de-stuffing information from said packet memory, and performing de-stuffing for the corresponding PPP frame data in accordance with the read de-stuffing information, the de-stuffing information being stored according to the session number by said network controller.

8. A deframing apparatus, comprising:
a packet data serving node in a mobile communication system, the mobile communication system including a base transceiver station, a plurality of mobile stations linked through radio, channels with the base transceiver station, and a host connected with the packet data serving node through an Internet network based on an Internet protocol, the packet data serving node connected with the base transceiver station through general routing encapsulation tunneling based on a point-to-point protocol, the mobile communication system converting PPP frame data received from the base transceiver station into IP packet data and transferring the IP packet data to the host, the PPP frame data conforming to a point-to-point protocol and being fragmented, the IP packet data conforming to an Internet protocol, the PPP frame data corresponding to a session number, said packet data serving node comprising:
a network controller receiving the PPP frame data and outputting the PPP frame data together with reassembling information and de-stuffing information in dependence upon the session number corresponding to the PPP frame data, the reassembling information having been negotiated when a point-to-point protocol link between the base transceiver station and said network controller is set;
a packet memory being in communication with said network controller, said packet memory storing the PPP frame data, the reassembling information and the de-stuffing information received from the network controller in dependence upon the session number corresponding to the PPP frame data; and
an IP frame generator being in communication with the network controller, said IP frame generator reading the PPP frame data corresponding to the session number and reading the reassembling information and de-stuffing information from the packet memory, and reassembling the read PPP frame data according to the reassembling information when reception of all PPP frame data corresponding to the session number has been completed, to generate one integrated piece of IP packet data, the IP packet data being data conforming to the Internet protocol, and IP frame generator comprising a byte de-stuffing processor performing byte de-stuffing for any stuffed data recorded in an information field of the PPP frame data in accordance with the de-stuffing information and the reassembling information, with said byte de-stuffing processor comprising:
a start flag search and eliminating unit detecting whether a start flag is in the PPP frame data and eliminating any start flag in the PPP frame data;
an end flag search and eliminating unit detecting whether an end flag is in the PPP frame data and eliminating any end flag in the PPP frame data, the session number corresponding to a first session number;
a control data register receiving a second session number distinguishable from the first session number, and, when the second session number is received in a state in which the end flag has been detected, reporting to said memory that reception of all of the PPP frame data corresponding to the first session number has been completed;
a byte stuffing search unit detecting whether the data recorded in the information field of the PPP frame data from which header information has been eliminated has been stuffed, and outputting the data recorded in the information field when the data has not been stuffed; and a byte de-stuffer performing de-stuffing for the data recorded in the information field and outputting the de-stuffed data to said memory when the data has been stuffed.

9. The deframing apparatus of claim 8, with said IP frame generator further comprising:

an interface interfacing with said packet memory when the reception of all PPP frame data corresponding to the session number has been completed;

a direct memory access controller controlling the interface;

a reception buffer temporarily storing the PPP frame data transferred by a first bit unit through said interface and outputting the stored PPP frame data by a second bit unit distinguishable from the first bit unit;

an address generator inputting the session number of the PPP frame data to generate a memory address corresponding to the session number;

a memory storing the PPP frame data received from the byte de-stuffing processor according to the memory address; and a transmission buffer receiving the byte de-stuffed PPP frame data from said memory according to the memory address and buffering the one integrated piece of IP packet data to said interface.

10. The deframing apparatus of claim 8, further comprising a cyclic redundancy check and comparison unit detecting whether the PPP frame data is normal by means of cyclic redundancy check information of the PPP frame data, the cyclic redundancy check information of the PPP frame data being obtained when said byte stuffing search unit detects whether the data recorded in the information field has been stuffed.

11. A framing method, comprising:

storing, by a network controller, IP packet data and control information corresponding to the IP packet data in a packet memory;

reading, by a PPP frame generator, the IP packet data and the control information from the packet memory; and fragmenting, by the PPP frame generator, the read IP packet data into a plurality of pieces of PPP frame data according to size information included in the control information, the PPP frame data being data conforming the point-to-point protocol, the plurality of pieces of PPP frame data including a first piece of PPP frame data and a last piece of PPP frame data, with a start flag being inserted into the first piece of PPP frame data and an end flag being inserted into the last piece of PPP frame data; and the plurality of pieces of PPP frame data being transmitted by the network controller to a base transceiver station, with the network controller and the PPP frame generator being included in a packet data serving node (PSDN) in a mobile communication system, the mobile communication system including the base transceiver station, a plurality of mobile stations linked through radio channels with the base transceiver station, and a host connected with the packet data serving node through an Internet network based on an Internet protocol, the packet data serving node being connected with the base transceiver station through general routing encapsulation tunneling based on the point-to-point protocol, the packet data serving node further comprising an IP frame generator for converting the PPP frame data received from the base transceiver station into IP packet data, with both the IP frame generator and the PPP frame generator being hardware modules separate from each other, the mobile communication system converting IP packet data received from the host into the PPP frame data and transferring the PPP frame data to the base transceiver station, the IP packet data conforming to the Internet protocol.

12. The framing method of claim 11, further comprising performing stuffing for each piece of the PPP frame data when stuffing is required by the control information, said stuffing being performed by the PPP frame generator.

13. A framing method, comprising:

storing, by a network controller, IP packet data and control information corresponding to the IP packet data in a packet memory;

reading, by a PPP frame generator, the IP packet data and the control information from the packet memory;

fragmenting, by the PPP frame generator, the read IP packet data into a plurality of pieces of PPP frame data according to size information included in the control information, the PPP frame data being data conforming the point-to-point protocol, said reading and fragmenting being performed by a PPP frame generator; and performing stuffing for each piece of the PPP frame data when stuffing is required by the control information, the plurality of pieces of PPP frame data including a first piece of PPP frame data and a last piece of PPP frame data, with a start flag being inserted into the first niece of PPP frame data and an end flag being inserted into the last piece of PPP frame data, the plurality of pieces of PPP frame data being transmitted to a base transceiver station, the network controller and the PPP frame generator being included in a packet data serving node (PDSN) in a mobile communication system, the mobile communication system including the base transceiver station, a plurality of mobile stations linked through radio channels with the base transceiver station, and a host connected with the packet data serving node through an Internet network based on an Internet protocol, the packet data serving node being connected with the base transceiver station through general routing encapsulation tunneling based on the point-to-Point protocol, the mobile communication system converting IP packet data received from the host into the PPP frame data and transferring the PPP frame data to the base transceiver station, the IP packet data conforming to the Internet protocol, with said fragmenting the read packet data comprising:

converting a flag value into a byte value, the flag value being negotiated when a point-to-point protocol link is set up, and setting the byte value as a reference value, and comparing the IP packet data with the reference value to detect an end flag;

determining whether to perform byte stuffing in dependence upon any detection of the end flag;

performing byte stuffing only for the IP packet data equal to the reference value; and outputting the plurality of pieces of PPP frame data in accordance with the size information.

14. The framing method of claim 13, further comprising: calculating a cyclic redundancy check value for each of the plurality of pieces of PPP frame data and inserting calculated cyclic redundancy check values in the plurality of pieces of PPP frame data.

15. A framing apparatus, comprising:

a packet data serving node in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on a point-to-point protocol, the mobile communication system converting IP packet data received from the host into a plurality of pieces of PPP frame data and transferring the pieces of the PPP frame data to the base transceiver station, the IP packet data conforming to an Internet protocol, said packet data serving node framing one integrated piece of IP packet data into a plurality of pieces of the PPP frame data, the plurality of pieces of the PPP frame data including a first piece of PPP frame data and a last piece of PPP frame data, the PPP frame data conforming the point-to-point protocol and being fragmented, each of the pieces of the PPP frame data corresponding to a session number, said packet data serving node comprising:
  a network controller receiving the IP packet data and outputting the received IP packet data with control information corresponding to the IP packet data;
  a packet memory being in communication with said network controller, said packet memory storing the IP packet data and the control information provided from said network controller; and
  a PPP frame generator being in communication with said network controller, said PPP frame generator reading the IP packet data with the control information corresponding to the IP packet data from said packet memory and fragmenting the read IP packet data into a plurality of pieces of PPP frame data in accordance with size information included in the control information, said PPP frame generator inserting a start flag into the first piece of PPP frame data and an end flag into the last piece of PPP frame data and transmitting the plurality of pieces of PPP frame data to the base transceiver station; and
  an IP frame generator being in communication with said network controller and converting the PPP frame data received from the base transceiver station to IP packet data; with the IP frame generator and the PPP frame generator being hardware modules separate from each other.

16. The framing apparatus of claim 15, with said PPP frame generator performing a stuffing operation for each piece of the PPP frame data in dependence upon the control information.

17. A framing apparatus, comprising:
a packet data serving node in a mobile communication system, the mobile communication system including a base transceiver station, a plurality of mobile stations linked through radio channels with the base transceiver station, and a host connected with the packet data serving node through an Internet network based on an Internet protocol, the packet data serving node connected with the base transceiver station through general routing encapsulation tunneling based on a point-to-point protocol, the mobile communication system converting P packet data received from the host into a plurality of pieces of PPP frame data and transferring the pieces of the PPP frame data to the base transceiver station, the IP packet data conforming to an Internet protocol, said packet data serving node framing one integrated piece of IP packet data into a plurality of pieces of the PPP frame data, the plurality of pieces of the PPP frame data including a first piece of PPP frame data and a last piece of PPP frame data, the PPP frame data conforming the point-to-point protocol and being fragmented, each of the pieces of the PPP frame data corresponding to a session number, said packet data serving node comprising:
  a network controller receiving the IP packet data and outputting the received IP packet data with control information corresponding to the IP packet data;
  a packet memory being in communication with said network controller, said packet memory storing the IP packet data and the control information provided from said network controller, and
  a PPP frame generator being in communication with said network controller, said PPP frame generator reading the IP packet data with the control information corresponding to the IP packet data from said packet memory and fragmenting the read IP packet data into a plurality of pieces of PPP frame data in accordance with size information included in the control information, performing a stuffing operation for each piece of the PPP frame data in dependence upon the control information, inserting a start flag into the first piece of PPP frame data and an end flag into the last piece of PPP frame data, and transmitting the plurality of pieces of PPP frame data to the base transceiver station, with said PPP frame generator comprising:
    a control data register outputting a flag value negotiated when a point-to-point protocol link is established;
    a stuffing option comparator converting the flag value into a byte value, setting the byte value as a reference value, and comparing the IP packet data with the reference value to detect an end flag;
    determining whether to perform byte stuffing in dependence upon the detection of the end flag; and
    a byte stuffer performing byte stuffing only for the IP packet data equal to the reference value and then outputting the stuffed IP packet data.

18. The framing apparatus of claim 17, further comprising a cyclic redundancy check calculation and an inserting unit calculating a cyclic redundancy check value for each one of the plurality of pieces of the PPP frame data and then inserting calculated cyclic redundancy check values in the plurality of pieces of the PPP frame data.

* * * * *